US012513520B2

(12) United States Patent
Fukushima et al.

(10) Patent No.: US 12,513,520 B2
(45) Date of Patent: Dec. 30, 2025

(54) COMMUNICATION APPARATUS, CONTROL METHOD, AND STORAGE MEDIUM

(71) Applicant: CANON KABUSHIKI KAISHA, Tokyo (JP)

(72) Inventors: Kentaro Fukushima, Tokyo (JP); Naoki Aoyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 318 days.

(21) Appl. No.: 18/171,108

(22) Filed: Feb. 17, 2023

(65) Prior Publication Data

US 2023/0269587 A1    Aug. 24, 2023

(30) Foreign Application Priority Data

Feb. 21, 2022    (JP) ................ 2022-024925

(51) Int. Cl.
*H04W 12/069* (2021.01)
*H04W 12/71* (2021.01)
(Continued)

(52) U.S. Cl.
CPC ......... *H04W 12/069* (2021.01); *H04W 12/71* (2021.01); *H04W 48/16* (2013.01);
(Continued)

(58) Field of Classification Search
CPC ... H04W 12/069; H04W 12/71; H04W 48/16; H04W 84/12; H04W 12/50; H04W 48/20; H04W 12/08; H04W 12/062; H04W 76/10
See application file for complete search history.

(56) References Cited

U.S. PATENT DOCUMENTS

| | | | |
|---|---|---|---|
| 2006/0094400 A1* | 5/2006 | Beachem ................ | H04W 4/02 455/410 |
| 2011/0228330 A1* | 9/2011 | Nogawa .............. | H04W 12/084 358/1.15 |

(Continued)

FOREIGN PATENT DOCUMENTS

| | | | |
|---|---|---|---|
| EP | 3703426 A1 * | 9/2020 | ........ H04W 28/0289 |
| EP | 4160357 A1 | 4/2023 | |

(Continued)

OTHER PUBLICATIONS

Cisco Press. (2010). Moving to WPA/WPA2-Enterprise Wi-Fi Encryption. https://www.ciscopress.com/articles/article.asp?p=1576225#:~:text=Both%20versions%20of%20Wi-Fi%20Protected%20Access%20%28WPA%2FWPA2%29%20can,needed%20for%20wireless%20networks%20in%20business%20environments.%20 (Year: 2010).*

*Primary Examiner* — Philip J Chea
*Assistant Examiner* — Dorianne Alvarado David
(74) *Attorney, Agent, or Firm* — CANON U.S.A., INC. IP DIVISION

(57) ABSTRACT

Based on a first operation being received for searching for an access point in which a first authentication method is enabled, information regarding the access point supporting the first authentication method is displayed, and information regarding the access point supporting a second authentication method different from the first authentication method is not displayed, and based on a second operation being received for searching for an access point in which the second authentication method different from the first authentication method is enabled, the second operation being different from the first operation, information regarding the access point supporting the second authentication method is displayed, and information regarding the access point supporting the first authentication method is not displayed.

20 Claims, 14 Drawing Sheets

(51) Int. Cl.
    *H04W 48/16*     (2009.01)
    *H04W 48/20*     (2009.01)
    *H04W 76/10*     (2018.01)
    H04W 12/062     (2021.01)
    H04W 12/08     (2021.01)
    H04W 12/50     (2021.01)
    H04W 84/12     (2009.01)

(52) U.S. Cl.
    CPC ........... *H04W 48/20* (2013.01); *H04W 76/10* (2018.02); *H04W 12/062* (2021.01); *H04W 12/08* (2013.01); *H04W 12/50* (2021.01); *H04W 84/12* (2013.01)

(56) References Cited

U.S. PATENT DOCUMENTS

| | | | |
|---|---|---|---|
| 2011/0231902 A1* | 9/2011 | Nagasaki | H04W 12/069 726/3 |
| 2011/0268027 A1* | 11/2011 | Nogawa | H04W 48/18 370/328 |
| 2014/0287695 A1* | 9/2014 | Nogawa | H04W 48/18 455/68 |
| 2018/0042056 A1* | 2/2018 | Hosoda | G06F 3/1204 |
| 2020/0137568 A1* | 4/2020 | Takeuchi | H04W 12/03 |
| 2020/0154348 A1* | 5/2020 | Choi | H04W 4/80 |

FOREIGN PATENT DOCUMENTS

| | | | |
|---|---|---|---|
| JP | 2021100159 A | 7/2021 | |
| JP | 2022112729 A | 8/2022 | |

\* cited by examiner

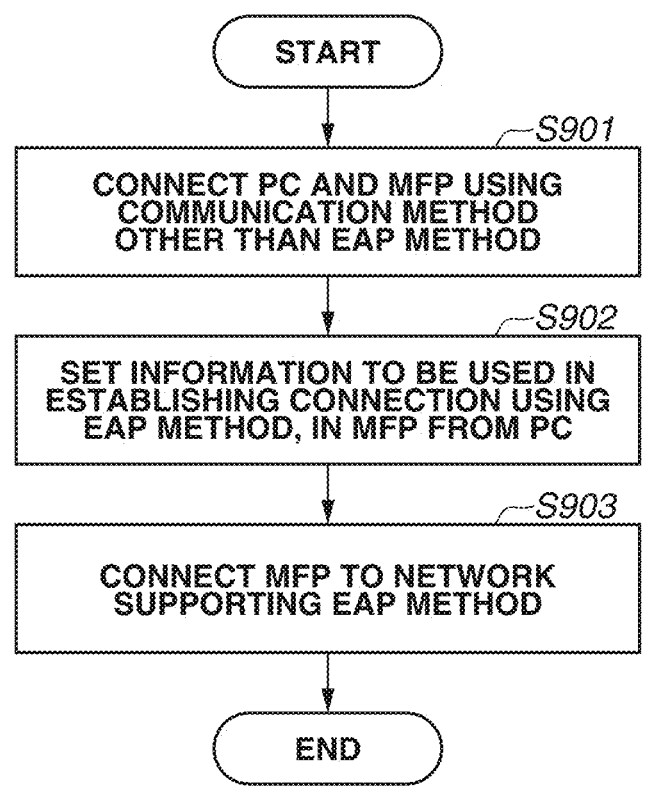

LAN CONSTRUCTED VIA INFRASTRUCTURE CONNECTION USING AUTHENTICATION METHOD INVOLVING AUTHENTICATION SERVER

LAN CONSTRUCTED VIA INFRASTRUCTURE CONNECTION USING AUTHENTICATION METHOD NOT INVOLVING AUTHENTICATION SERVER

LAN CONSTRUCTED VIA DIRECT CONNECTION

FIG.11A

SETTING MENU
PRINTER STATE —1101
MAIN BODY SETTING —1102
LAN SETTING —1103
SECURITY SETTING —1104

FIG.11B

SECURITY SETTING
SSL/TLS SETTING —1111
IEEE 802.1X/EAP SETTING
1112

FIG.11C

IEEE 802.1X/EAP SETTING
AUTHENTICATION METHOD —1121
SETTING OF KEY AND CERTIFICATE —1122
ENABLING/DISABLING OF IEEE 802.1X/EAP —1123

FIG.11D

AUTHENTICATION METHOD
AUTHENTICATION METHOD
⦿ EAP-TLS —1131
◯ EAP-TTLS —1132
◯ PEAP —1133
USER NAME [ ] —1134
PASSWORD [ ] —1135

FIG.11E

SETTING OF KEY AND CERTIFICATE
UPLOAD OF KEY AND CERTIFICATE —1141
DELETION OF KEY AND CERTIFICATE —1142
CONFIRMATION OF KEY AND CERTIFICATE —1143

FIG.11F

UPLOAD OF KEY AND CERTIFICATE
SELECT FILE
[          ] [...] —1161
ENTER PASSWORD
[          ] —1162
( UPLOAD ) —1163

FIG.11G

ENABLING/DISABLING OF IEEE 802.1X/EAP
ENABLED —1151
DISABLED ✓ —1152

FIG.11J —1171

ENABLE SETTING OF IEEE 802.1X/EAP

CONNECTING TO IEEE 802.1X/EAP NETWORK
WIRELESS DIRECT CONNECTION IS
UNAVAILABLE

[ OK ]

COMMUNICATION APPARATUS, CONTROL METHOD, AND STORAGE MEDIUM

BACKGROUND OF THE INVENTION

Field of the Invention

The present invention relates to a communication apparatus, a control method, and a storage medium.

Description of the Related Art

There has been known a technique regarding wireless connection between a communication apparatus and an access point supporting a specific authentication method.

Japanese Patent Application Laid-Open No. 2021-100159 discusses a technique of determining a type of an authentication method supported by an access point to be wirelessly connected with a communication apparatus, and appropriately diagnosing a state of wireless connection between the communication apparatus and the access point in accordance with the type of the authentication method.

On the other hand, further improvement in convenience of a technique regarding wireless connection between a communication apparatus and an access point supporting a specific authentication method has been demanded.

SUMMARY OF THE INVENTION

According to an aspect of the present invention, a communication apparatus includes a reception unit configured to receive a search instruction of an access point that can communicate with the communication apparatus, and a display unit configured to display information regarding the access point, on the communication apparatus, wherein, on the display unit, based on a first operation being received for searching for an access point in which a first authentication method is enabled, information regarding the access point supporting the first authentication method is displayed, and information regarding the access point supporting a second authentication method different from the first authentication method is not displayed, and wherein, on the display unit, based on a second operation being received for searching for an access point in which the second authentication method different from the first authentication method is enabled and the second operation being different from the first operation, information regarding the access point supporting the second authentication method is displayed, and information regarding the access point supporting the first authentication method is not displayed.

Further features of the present invention will become apparent from the following description of exemplary embodiments with reference to the attached drawings.

BRIEF DESCRIPTION OF THE DRAWINGS

FIG. 9 is a flowchart related to setup processing of a communication apparatus.
FIGS. 11A to 11G and 11J to 11K each illustrate an example of an operation display unit related to setup processing of a communication apparatus.

DESCRIPTION OF THE EMBODIMENTS

Figure 1:
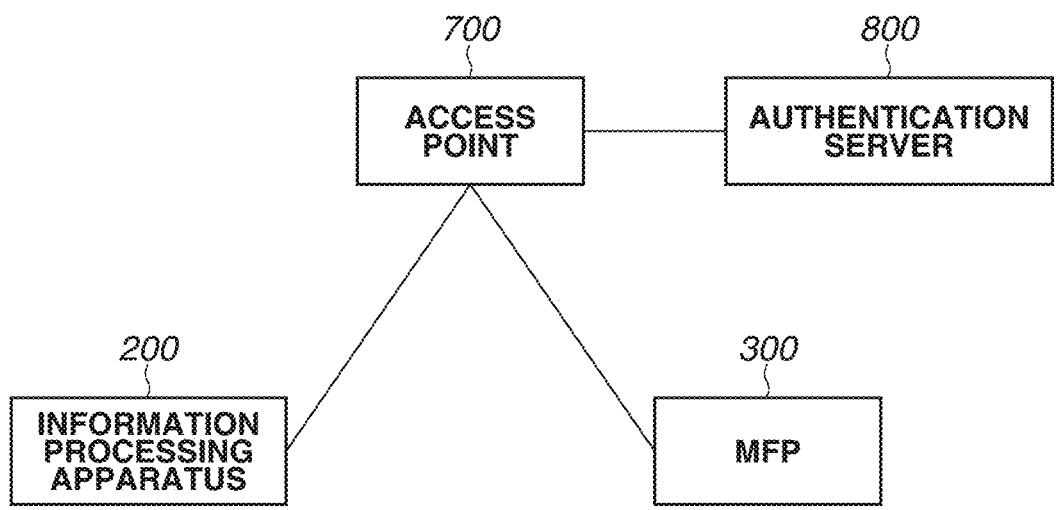
FIG. 1 is a system configuration diagram.

Hereinafter, an exemplary embodiment of the present invention will be described with reference to the drawings. It is to be understood that the scope of the present invention also encompasses modifications and improvements of the exemplary embodiment to be described below that are appropriately made based on the general knowledge of the one skilled in the art, without departing from the gist of the present invention. Not all of a plurality of features described in the exemplary embodiment are always essential to the invention, and the plurality of features may be arbitrarily combined. Furthermore, in the attached drawings, the same or similar configurations are assigned the identical reference numerals, and the redundant description will be omitted. Each of the embodiments of the present invention described below can be implemented solely or as a combination of a plurality of the embodiments or features thereof where necessary or where the combination of elements or features from individual embodiments in a single embodiment is beneficial.

An information processing apparatus 200, a communication apparatus 300, an access point 700, and an authentication server 800 that are included in a communication system according to the present exemplary embodiment will be described with reference to FIG. 1. In this system, a plurality of apparatuses are configured to be able to perform wireless communication with each other. In the present exemplary embodiment, a smartphone is exemplified as an information processing apparatus, but the information processing apparatus is not limited to this. For example, various apparatuses such as a personal computer (PC), a mobile terminal, a tablet terminal, a personal digital assistant (PDA), and a digital camera can be applied as the information processing apparatus. In the present exemplary embodiment, a multifunction printer (hereinafter, MFP) that can provide a copy service, a FAX service, and a printing service is exemplified as a communication apparatus, but the communication apparatus is not limited to this. Various apparatuses can be applied as long as the apparatuses can perform wireless communication with the information processing apparatus. For example, the communication apparatus may be a printing apparatus (printer). If the communication apparatus is a printing apparatus, an inkjet printer, a full-color laser beam printer, and a monochrome printer can be applied as the communication apparatus. In addition, not only a printer but also a copier, a facsimile apparatus, a mobile terminal, a smartphone, a note PC, a tablet terminal, a PDA, a digital camera, a music reproduction device, a television, and a smart speaker can also be applied. Moreover, a multifunction peripheral having a plurality of functions such as a copy function, a FAX function, and a printing function can also be applied. The smart speaker is an apparatus for issuing a processing instruction to a device existing within the same network, in accordance with voice uttered by a user, and notifying the user of information acquired via the network, in response to voice uttered by the user. Moreover, a single-function printer (hereinafter, SFP) having a single function can also be applied.

The access point 700 is a communication apparatus provided separately from (provided on the outside of) the information processing apparatus 200 and the MFP (communication apparatus) 300, and operating as a base station apparatus of a wireless local area network (WLAN). The access point 700 will be sometimes referred to as an external access point 700 or an external wireless base station.

A communication apparatus having a communication function of a WLAN can perform communication in an infrastructure mode of the WLAN via the access point 700. Wireless infrastructure connection refers to connection established with the information processing apparatus 200 via the access point 700, and the wireless infrastructure mode can be rephrased as a mode for a communication apparatus communicating with the information processing apparatus 200 via the access point 700 to which the communication apparatus connects. The access point 700 communicates with a communication apparatus (an authenticated communication apparatus) permitted to connect to the access point 700, and relays wireless communication between the communication apparatus and another communication apparatus. The access point 700 is also connected to a wired LAN communication network, and relays communication between a communication apparatus connected to the wired LAN communication network, and another communication apparatus wirelessly connecting to the access point 700.

In a case where an authentication method of a network constructed by the access point 700 is a method that uses the authentication server (Radius server) 800, the access point 700 performs access control by authenticating a communication apparatus connecting to the network, in cooperation with the authentication server 800. A communication apparatus connecting to the network constructed by the access point 700 is restricted from communicating with an apparatus other than the authentication server 800, until being authenticated by the access point 700. With this configuration, connection with high security is established. The access point 700 may support an authentication method that does not use an authentication server. The authentication method that uses an authentication server, and the authentication method that does not use an authentication server will be described in detail below.

The authentication server 800 is an apparatus that is provided separately from the information processing apparatus 200, the MFP 300, and the access point 700, and collectively manages authentication information. The authentication server 800 can execute authentication processing complying with an Institute of Electrical and Electronics Engineers (IEEE) 802.1X standard, for example. In the present exemplary embodiment, the authentication server 800 authenticates an authentication target terminal or apparatus in cooperation with the access point 700, and performs access control of the terminal or the apparatus based on an authentication result. Here, the access point 700 corresponds to an authenticator in the IEEE 802.1X. In addition, the information processing apparatus 200 and the MFP 300 correspond to supplicants in the IEEE 802.1X. Then, the authentication server 800 performs authentication using an Extensible Authentication Protocol-Transport Layer Security (EAP-TLS) method, an EAP-Tunneled TLS (EAP-TTLS) method, and a Protected EAP (PEAP) method, for example, in the IEEE 802.1X standard. The EAP-TLS method is an authentication method that uses a handshake protocol of TLS, and authentication is performed using a server certificate and a client certificate. The EAP-TTLS method is an authentication method that uses a handshake protocol of TLS, and authentication is performed using a server certificate, a user name, and a password. In the PEAP method, authentication is performed using a user name and a password. Information to be used in these types of authentication complying with the IEEE 802.1X standard will be sometimes collectively referred to as "authentication information".

Using their respective WLAN communication functions, the information processing apparatus 200 and the MFP 300 can establish wireless infrastructure connection via the external access point 700, or can perform wireless communication via direct connection not involving the external access point 700. The direct connection includes Wi-Fi Direct (WFD)® and a software access point (SoftAP) mode. In other words, the above-described communication is implemented by direct connection complying with an IEEE 802.11 series standard. The information processing apparatus 200 and the MFP 300 can execute processing adapted to a plurality of printing services, using WLAN communication, which will be described in detail below.

Figure 2:
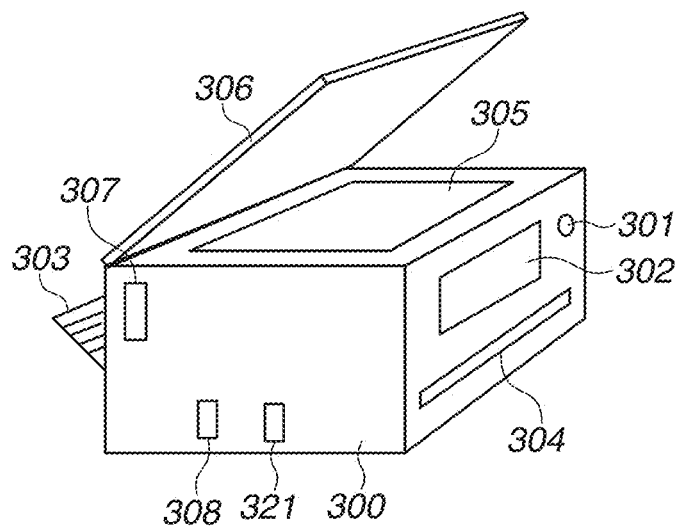
FIG. 2 is an external view of a communication apparatus.

FIG. 2 is a perspective view illustrating an example of an external appearance configuration of the MFP 300. The MFP 300 includes an operation display unit (operation panel) 302, a print sheet insertion port 303, a print sheet discharge port 304, a document platen 305, and a document cover (upper platen cover) 306. A hardware key to be used when the power of the MFP 300 is turned on and off is provided on a casing of the MFP 300 as a power button 301. The operation display unit 302 includes a display and buttons to be used when the MFP 300 is operated. For example, the operation display unit 302 includes a plurality of keys such as character entry keys, cursor keys, a determination key, and a cancellation key, and a light emitting diode (LED), and a light source of a liquid crystal display (LCD). The operation display unit 302 is configured to be able to receive operation input of the user in a case where each function in the MFP 300 is activated, or in a case where various settings are changed. For example, a touch panel display is used as the operation display unit 302.

The print sheet insertion port 303 is an insertion port for setting sheets with an arbitrary size. Sheets set on the print sheet insertion port 303 are conveyed to a print unit one by one, and printing is executed thereon. Sheets having been subjected to printing are discharged from the print sheet discharge port 304. The document platen 305 is a glass transparent plate, for example, and is used when an image on a placed document is read using a scan function. The document cover 306 is a cover for pressing a document against the document platen 305 in such a manner as to prevent the document from moving upward away from the document platen 305, when an image is read using the scan function. The document cover 306 can also shield a main body of the MFP 300 from external light.

The MFP 300 also has a communication function via a WLAN or a wired LAN. In the present exemplary embodiment, in addition to an antenna for implementing wireless communication, the MFP 300 is provided with a communication unit 321 for a wired LAN. The MFP 300 is also provided with a universal serial bus (USB) communication unit 308 that can implement communication with the external information processing apparatus 200 via USB connection.

Figure 3:
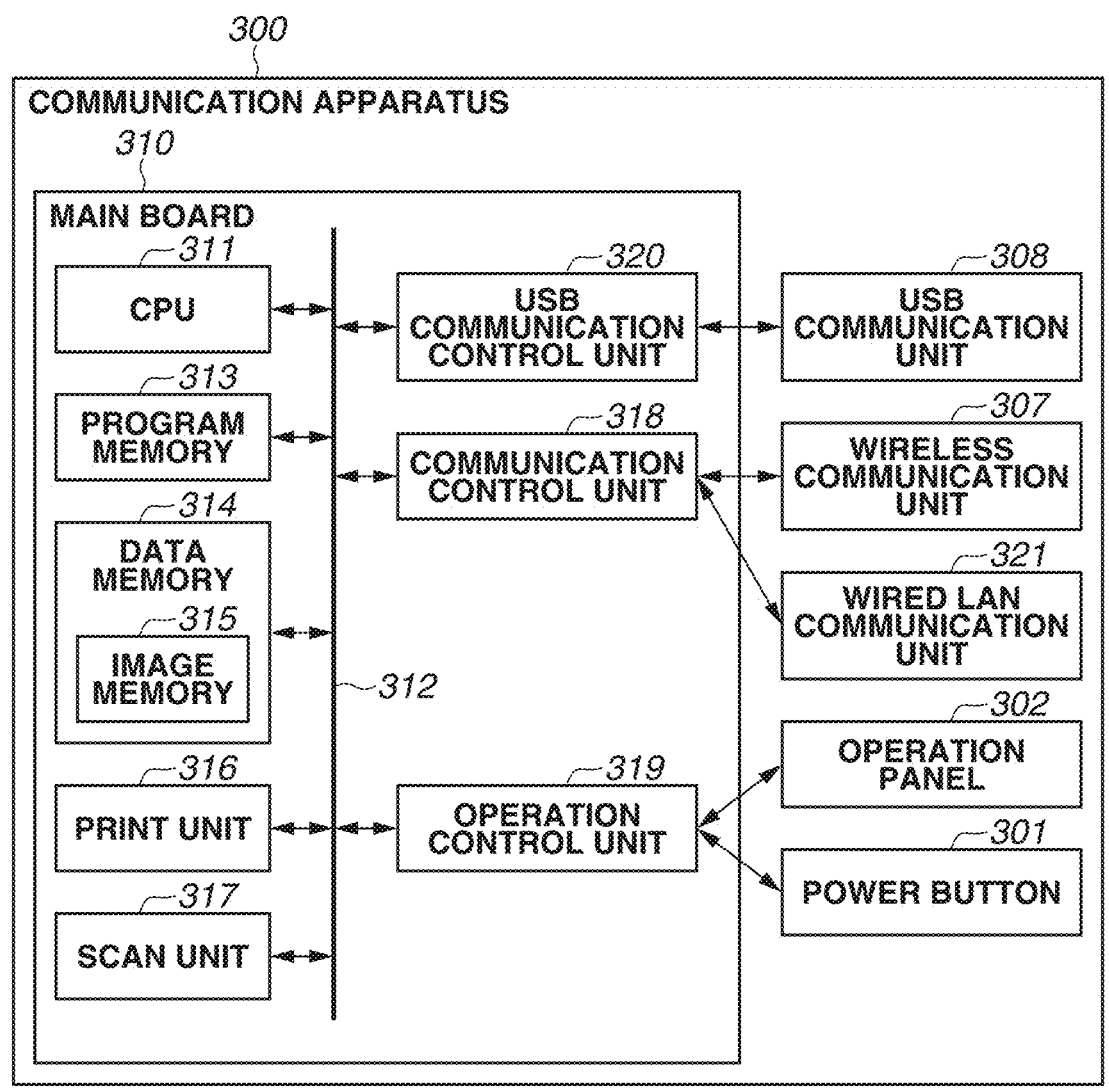
FIG. 3 is a configuration diagram of a communication apparatus.

FIG. 3 is a block diagram illustrating an example of a configuration of the MFP 300. In addition to including a main board 310 for controlling the entire apparatus, the MFP 300 includes a wireless communication unit 307 and the USB communication unit 308. The main board 310 includes a central processing unit (CPU) 311, an internal bus 312, a program memory 313, a data memory 314, a print unit 316, a scan unit 317, a communication control unit 318, an operation control unit 319, and a USB communication control unit 320. Processing to be described below as processing to be executed by the MFP 300 is actually implemented by the CPU 311 executing a program stored in the program memory 313 or the data memory 314.

The CPU 311, the program memory 313, and the data memory 314 are a micro processing unit, a read only memory (ROM), and a random access memory (RAM), respectively. In the present exemplary embodiment, the CPU 311, the program memory 313, and the data memory 314 are connected to each other via a bus cable forming the internal bus 312. The CPU 311 performs calculation processing for implementing each function to be described in the exemplary embodiment, based on a control program stored in the program memory 313, and content in the data memory 314.

For example, the CPU 311 can control the scan unit 317 to read an image on a document, and store the image (image data) into an image memory 315 in the data memory 314. The CPU 311 can control the print unit 316 to print an image stored in the image memory 315, onto a recording medium. The CPU 311 can control the USB communication unit 308 via the USB communication control unit 320, and perform USB communication with the external information processing apparatus 200 via USB connection. The CPU 311 can control the operation control unit 319 to receive information indicated by operation input performed via the power button 301 or the operation display unit 302. The CPU 311 can also control the operation control unit 319 to display a state of the MFP 300 and a function selection menu on the operation display unit 302.

The wireless communication unit 307 is configured to be able to provide a communication function of a WLAN, and provides a function similar to that of a WLAN unit 201 of the information processing apparatus 200, for example. More specifically, the wireless communication unit 307 transmits a packet converted from data by a method complying with a predetermined standard, to another device, converts a packet from another device to original data, and outputs the original data to the CPU 311. The wireless communication unit 307 is configured to be able to execute data (packet) communication in a WLAN system complying with an IEEE 802.11 standard series (IEEE 802.11a/b/g/n/ac/ax), but the wireless communication unit 307 may be able to execute communication in a WLAN system complying with another standard. In this example, the wireless communication unit 307 can execute communication in both frequency bands of a 2.4 gigahertz (GHz) band and a 5 GHz band. The wireless communication unit 307 can further execute communication that is based on WFD, communication in the SoftAP mode, and communication via wireless infrastructure connection, which will be described in detail below. The information processing apparatus 200 and the MFP 300 can execute wireless direct communication that is based on WFD, and the wireless communication unit 307 can have a SoftAP function or a group owner function. More specifically, the wireless communication unit 307 can construct a network of direct connection, and determine a channel to be used for direct connection.

The wired LAN communication unit 321 is configured to be able to execute communication in a wired manner. For example, the wired LAN communication unit 321 can execute data (packet) communication in a wired LAN (Ethernet) system complying with an IEEE 802.3 series standard. In wired communication executed using the wired LAN communication unit 321, communication in a wired mode is executable. Here, the wired LAN communication unit 321 is connected to the main board 310 via a bus cable forming the internal bus 312. In executing communication via wired connection, the MFP 300 can communicate with another communication apparatus via a wired interface such as the wired LAN communication unit 321. When the MFP 300 executes communication via wired connection, communication via wireless infrastructure connection is restricted. Via wired connection, data (packet) communication in a wired LAN (Ethernet) complying with the IEEE 802.3 series standard, for example, is executable. In a case where the MFP 300 operates in a state in which an IEEE 802.1X/EAP setting is enabled, when the MFP 300 connects to a wired LAN constructed by the access point 700, the MFP 300 executes authentication complying with the IEEE 802.1X standard.

Figure 4A:
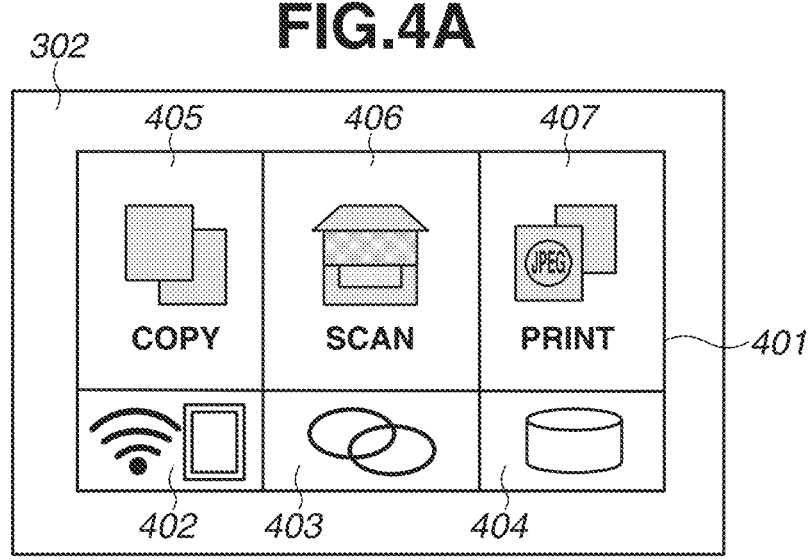
FIGS. 4A to 4C each illustrate an example of an operation display unit of a communication apparatus.
Figure 4B:
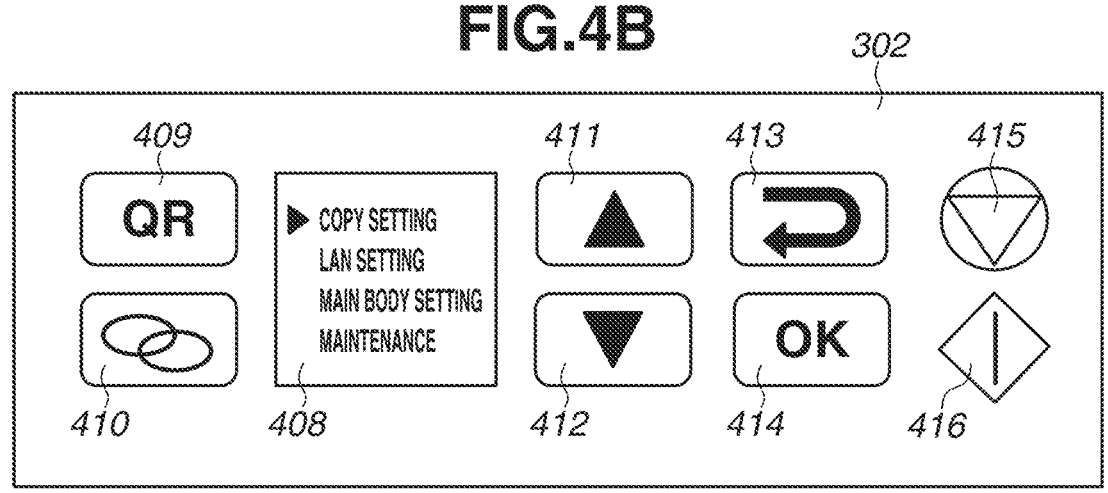
Figure 4C:
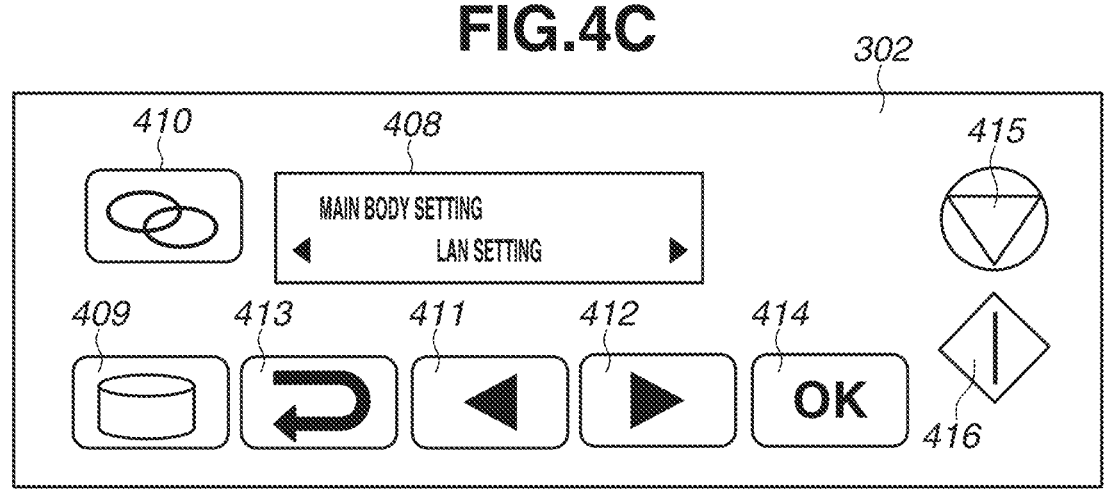

FIGS. 4A to 4C schematically illustrate a configuration example of the operation display unit 302 of the MFP 300.

FIG. 4A illustrate an example in a case where the operation display unit 302 includes a touch panel display 401 as an operation display screen. By touching the power button 301, the user can activate the MFP 300. When the MFP 300 is activated, a home screen (topmost hierarchy on a menu screen) is displayed on the touch panel display 401 as a screen on which the user can perform operation input. For example, the home screen includes a copy region 405, a scan region 406, and a print region 407. The copy region 405 receives an execution instruction of copy processing. The scan region 406 receives an execution instruction of scan processing. The print region 407 receives an execution instruction of printing processing. The home screen further includes a state display region 402, a connection setting mode region 403, and a setting region 404. The state display region 402 indicates a setting of infrastructure connection or direct connection of the MFP 300, and a connection state of the MFP 300. By the connection setting mode region 403, the user can start an operation in a connection setting mode at an arbitrary timing. In addition, using the setting region 404, the user can change various settings.

FIG. 4B illustrates an example in a case where the operation display unit 302 includes a small-sized LCD 408 as an operation display screen, and various hardware keys 409 to 416 as operation units.

When the MFP 300 is activated, a home screen is displayed on the LCD 408. By pressing cursor movement buttons 411 and 412, the user can operate a cursor displayed on the LCD 408. The user is only required to press an OK button 414 when executing an operation, and press a return button 413 when returning to a previous menu screen. By pressing a quick response (QR) button 409, it is also possible to display a QR Code® including information for directly connecting with the MFP 300.

The code displayed on the LCD 408 is not limited to a QR code, and is only required to be a two-dimensional code.

By reading the QR code from the information processing apparatus 200, the information processing apparatus 200 and the MFP 300 are directly connected and become able to execute wireless communication with each other. By pressing a connection setting mode button 410, it also becomes possible to start the connection setting mode. It is possible to connect the MFP 300 to the access point 700 by transmitting connection information to the MFP 300 using the information processing apparatus 200. If a stop button 415 is pressed while the MFP 300 is executing various types of processing, various types of processing are cancelled. Furthermore, by pressing a copy start button 416, the user can execute printing by scanning a document on the MFP 300.

The layout illustrated in FIG. 4B may be appropriately changed. For example, as illustrated in FIG. 4C, layout positions of the cursor movement buttons 411 and 412 may be changed, and a cursor operation may be performed in a left-right direction.

Figure 5:
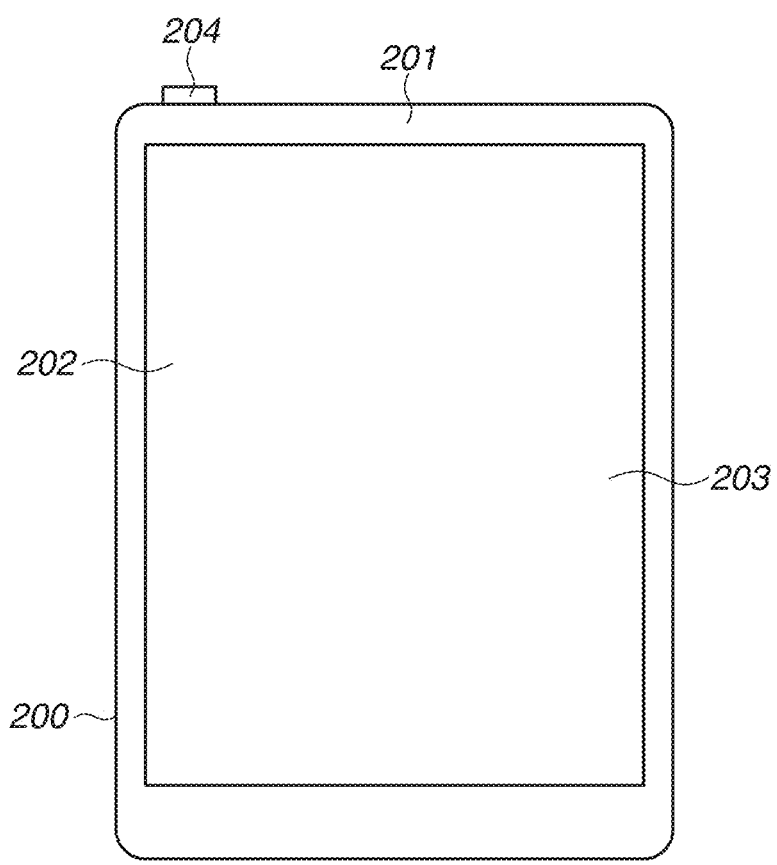
FIG. 5 is an external view of an information processing apparatus.

Next, FIG. 5 illustrates an example of an external appearance configuration of the information processing apparatus 200. In the present exemplary embodiment, the information processing apparatus 200 is a smartphone, and includes a display unit 202, an operation unit 203, and a power key 204. The power key 204 is provided as a hardware key for turning on or off the power of the information processing apparatus 200. In the present exemplary embodiment, the display unit 202 is a display having an LCD-system display mechanism. As another exemplary embodiment, information may be displayed using an LED. The information processing apparatus 200 may include a function of outputting information by sound in association with or in place of the display unit 202. The operation unit 203 includes a hardware key such as a key or a button, or a touch panel, and is configured to be able to detect operation input of the user.

In the present exemplary embodiment, a touch panel display is used as the display unit 202 and the operation unit 203. In other words, the display unit 202 and the operation unit 203 are implemented by a single hardware component. In this case, for example, button icons and a software keyboard are displayed using a function of the display unit 202, and operation input performed by the user on these is detected by a function of the operation unit 203. As another exemplary embodiment, the display unit 202 and the operation unit 203 may be provided as separate hardware components.

The information processing apparatus 200 also includes the WLAN unit 201 that can provide a communication function of a wireless LAN (WLAN). The WLAN unit 201 is configured to be able to execute data (packet) communication in a WLAN system complying with an IEEE 802.11 series standard (IEEE 802.11a/b/g/n/ac/ax, etc.), for example. The WLAN unit 201 may be able to execute communication in a WLAN system complying with another standard. In this example, the WLAN unit 201 can execute communication in both frequency bands of the 2.4 GHz band and the 5 GHz band. The WLAN unit 201 can further execute communication that is based on WFD, communication in the SoftAP mode, and communication via wireless infrastructure connection, which will be described in detail below.

Figure 6:
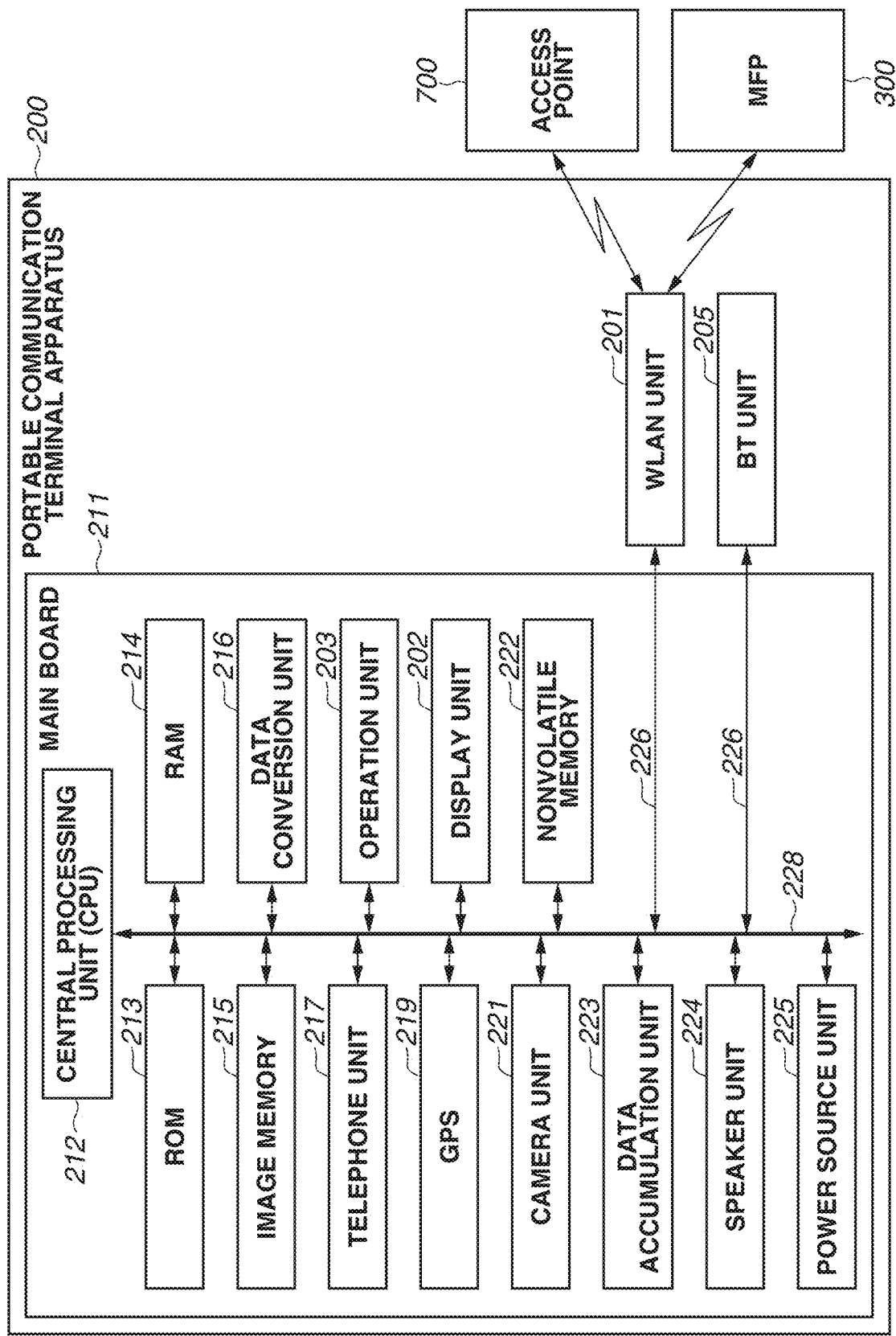
FIG. 6 is a configuration diagram of an information processing apparatus.

FIG. 6 illustrates a configuration example of the information processing apparatus 200. The information processing apparatus 200 includes a main board 211 that performs main control of the apparatus itself, the WLAN unit 201 that performs WLAN communication, and a Bluetooth® (BT) unit 205.

In the present exemplary embodiment, the main board 211 includes a CPU 212, a ROM 213, a RAM 214, an image memory 215, and a data conversion unit 216. The main board 211 further includes a telephone unit 217, a global positioning system (GPS) 219, a camera unit 221, a nonvolatile memory 222, a data accumulation unit 223, a speaker unit 224, and a power source unit 225. These functional units in the main board 211 are connected to each other via a system bus 228, and managed by the CPU 212. The main board 211 and the WLAN unit 201 are connected via a dedicated bus 226, and the main board 211 and the BT unit 205 are connected via a dedicated bus 226.

The CPU 212 functions as a system control unit that controls each component of the information processing apparatus 200. Each function in the information processing apparatus 200 that is exemplified in FIG. 6, and processing to be described below as processing to be executed by the information processing apparatus 200 are implemented by the CPU 212 loading a program stored in the ROM 213, onto the RAM 214, and executing the program.

The ROM 213 stores control programs to be executed by the CPU 212, and an embedded operating system (OS) program. By executing a corresponding program under an embedded OS, the CPU 212 performs software control such as scheduling or task switch.

The RAM 214 includes a static RAM (SRAM). The RAM 214 stores various types of data such as variables for program control, setting values registered by the user, and management data for managing the information processing apparatus 200. The RAM 214 can be used as various working buffers.

The image memory 215 includes a memory such as a dynamic RAM (DRAM).

The image memory 215 temporarily stores image data received via the WLAN unit 201, and image data read out from the data accumulation unit 223, and makes the image data processable by the CPU 212.

The nonvolatile memory 222 includes a memory such as a flash memory, for example, and holds stored data even if the power of the information processing apparatus 200 is turned off.

A memory configuration of the information processing apparatus 200 is not limited to the above-described example. For example, the image memory 215 and the RAM 214 may be provided as a common memory, and data backup may be performed using the data accumulation unit 223. A DRAM has been described as an example of the image memory 215, but another storage medium such as a hard disk drive (HDD) or a nonvolatile memory may be used.

The data conversion unit 216 can also perform analysis of data in various formats in addition to data conversion such as color conversion or image conversion.

The telephone unit 217 controls a telephone line. By processing voice data input or output via the speaker unit 224, the telephone unit 217 makes telephone communication executable.

The GPS 219 receives radio waves transmitted from a satellite, and acquires position information such as the current latitude and longitude of the information processing apparatus 200.

The camera unit 221 has a function of electronically recording an image input via a lens, and encoding the image. Image data obtained by image capturing performed by the camera unit 221 is stored into the data accumulation unit 223.

The speaker unit 224 performs input-output of voice for a telephone function, and control for implementing a function such as alarm notification.

The power source unit 225 includes a buttery, and controls power supply to each component in the apparatus. Examples of power states include a battery depleted state in which a battery remaining amount has reached a reference value or less, a power-off state in which the power key 204 has not been pressed, a power-on state (activated state) in which the power key 204 has been pressed, and a power saving state in which power consumption of each component is suppressed.

The display unit 202 electronically controls display content, and performs control for receiving operation input performed by the user, and displaying an operating status of the MFP 300 and a status of the MFP 300.

In response to operation input received from the user, the operation unit 203 outputs an electrical signal corresponding to the operation input, to the CPU 212. As described above with reference to FIG. 5, a touch panel display is used as the display unit 202 and the operation unit 203.

The information processing apparatus 200 can perform wireless communication using the WLAN unit 201, and performs data communication with another device such as the MFP 300. For example, the information processing apparatus 200 converts data into a packet, and transmits the packet to another external device. In addition, the information processing apparatus 200 receives a packet from another external device via the WLAN unit 201, converts the packet into original data, and outputs the original data to the CPU 212.

The configuration of the main board 211 is not limited to the above-described example. For example, each function of the main board 211 that is to be implemented by the CPU 212 may be implemented by a processing circuit such as an application specific integrated circuit (ASIC). In other words, each function may be implemented by whichever of hardware and software.

Figure 7:
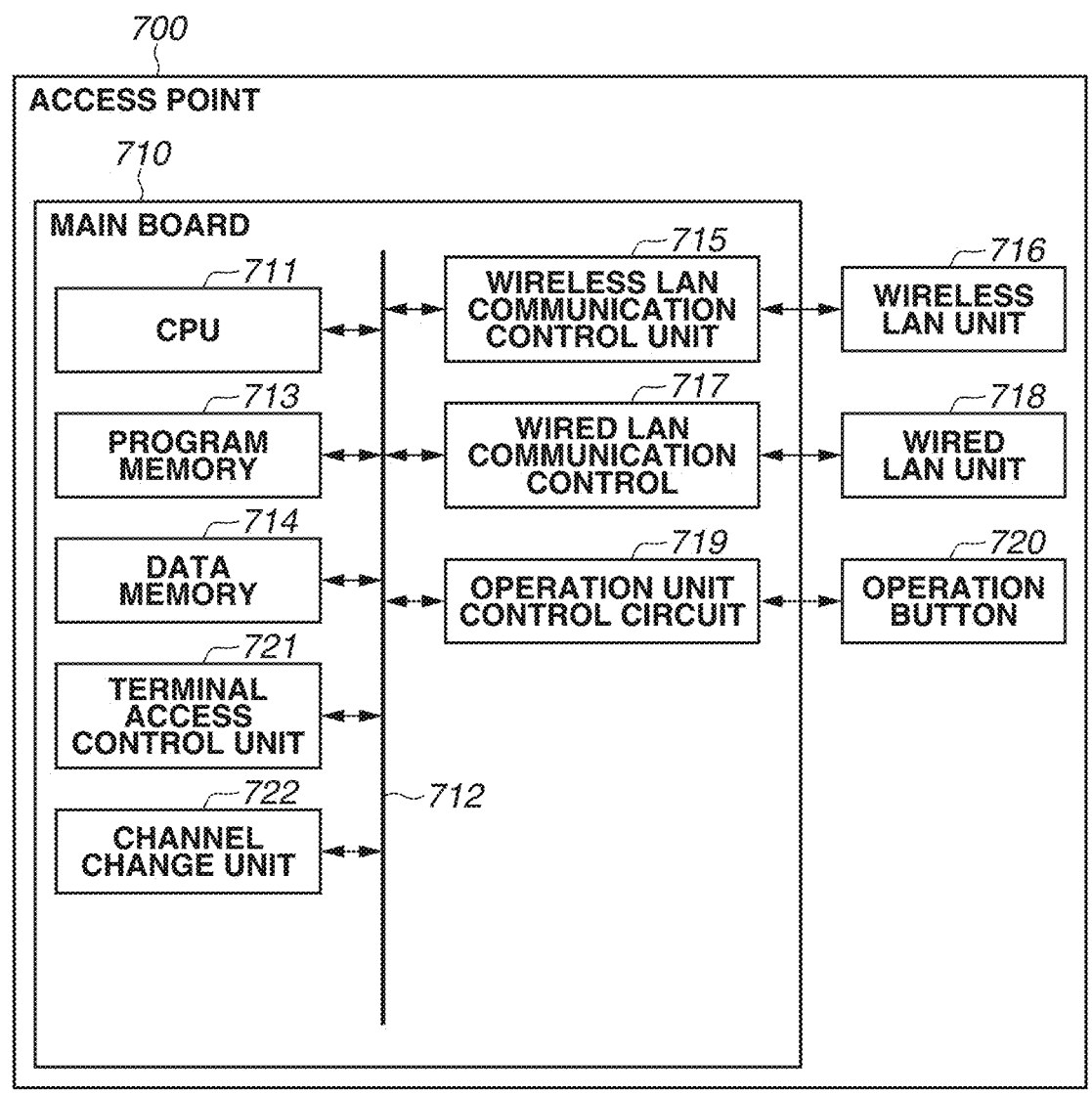
FIG. 7 is a configuration diagram of an access point.

Next, FIG. 7 illustrates a configuration example of the access point (AP) 700 having a wireless LAN access point function. The access point 700 includes a main board 710 that performs system control, a wireless LAN unit 716, a wired LAN unit 718, and an operation button 720. The main board 710 includes a CPU 711, a program memory 713, a data memory 714, a wireless LAN communication control unit 715, a wired LAN communication control unit 717, an operation unit control circuit 719, a terminal access control unit 721, and a channel change unit 722. These components are connected via an internal bus 712 in such a manner that communication can be performed with each other. Processing to be described below as processing to be executed by the access point 700 is actually implemented by the CPU 711 executing a program stored in the program memory 713 or the data memory 714.

The CPU 711 performs calculation processing based on a control program stored in the program memory 713, and data held in the data memory 714. By controlling the wireless LAN unit 716 via the wireless LAN communication control unit 715, the CPU 711 can perform wireless LAN communication with another communication information processing apparatus. By controlling the wired LAN unit 718 via the wired LAN communication control unit 717, the CPU 711 can perform wired LAN communication with another communication information processing apparatus. By controlling the operation unit control circuit 719, the CPU 711 can receive operation input performed by the user using the operation button 720.

To protect a network, the terminal access control unit 721 authenticates a communication apparatus connecting to the encrypted access point 700. As standards of encryption, Wi-Fi Protected Access (WPA) and WPA2 have been known. In response to a demand for higher security, a standard called WPA3 has appeared. Furthermore, authentication methods include a pre-shared key (PSK) method that uses a PSK, and a Simultaneous Authentication of Equals (SAE) method that uses SAE. An authentication method that uses these methods is regarded as a Personal method. As another authentication method, there is an IEEE 802.1X authentication method (IEEE 802.1X method) that uses an authentication server operating in compliance with an Extensible Authentication Protocol (EAP) as an authentication protocol. Because the EAP is used in the IEEE 802.1X authentication method, the IEEE 802.1X authentication method is described as an IEEE 802.1X/EAP authentication method.

Hereinafter, the IEEE 802.1X/EAP will be sometimes simply described as "802.1X/EAP". In addition, the IEEE 802.1X/EAP authentication method will also be described as an EAP method. A communication channel authenticated in this manner can be changed or switched by the channel change unit 722. As another authentication method, a Wi-Fi CERTIFIED Enhanced Open™ method that enables a network to be protected even in a public place also exists. In the present exemplary embodiment, an authentication method that does not use an authentication server is the PSK method or the SAE method, and an authentication method that uses an authentication server is the EAP method. The authentication method that does not use an authentication server will also be referred to as a Personal method, and the authentication method that uses an authentication server will also be referred to as an Enterprise method.

Figure 8:
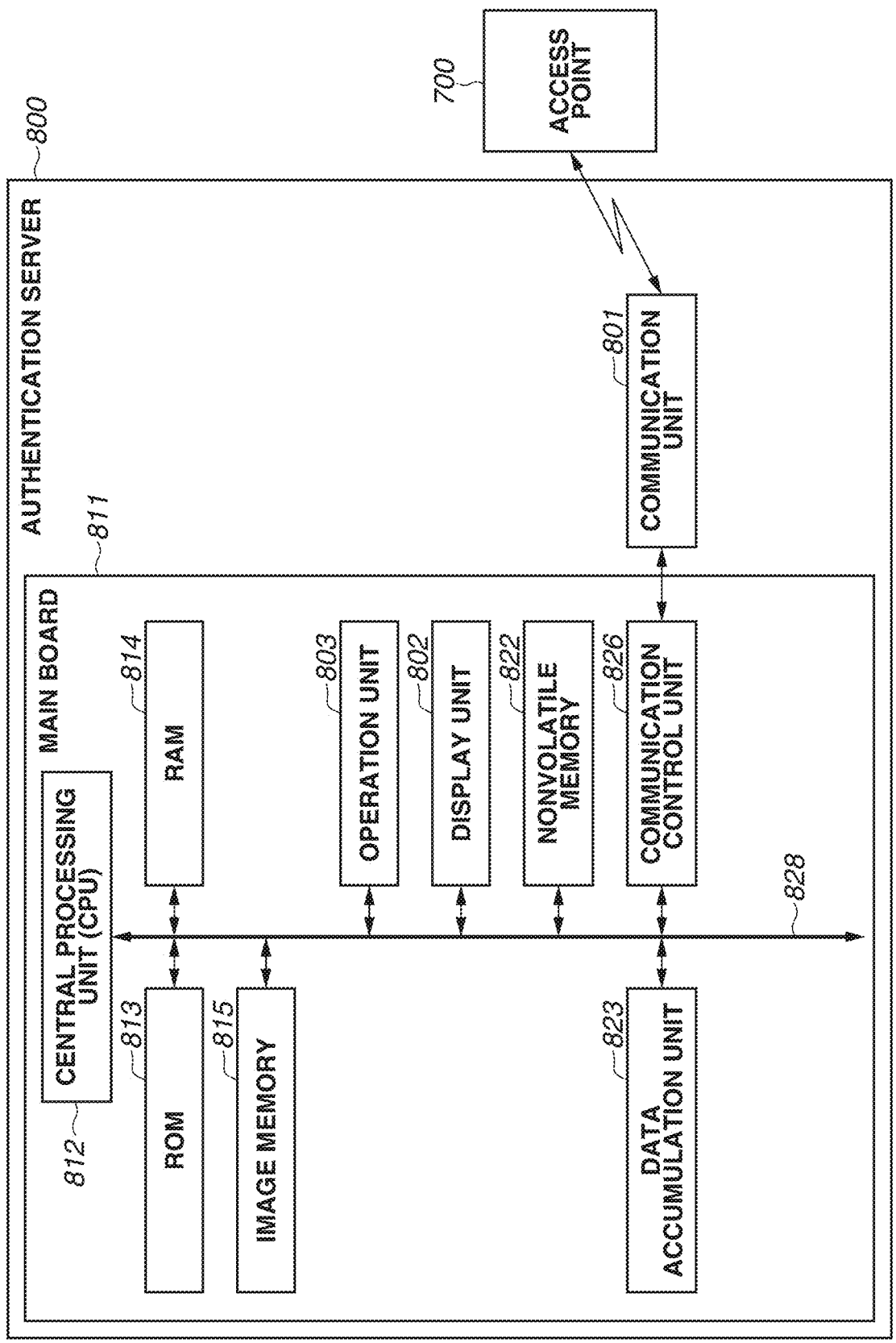
FIG. 8 is a configuration diagram of an authentication server.

Next, FIG. 8 illustrates a configuration example of the authentication server 800. The authentication server 800 includes a main board 811 that performs system control, and a communication unit 801 that performs wired LAN communication.

The main board 811 includes a CPU 812, a ROM 813, a RAM 814, an image memory 815, a nonvolatile memory 822, a data accumulation unit 823, and a communication control unit 826. The main board 811 further includes a display unit 802 and an operation unit 803. These components are connected to each other via a system bus (bus cable) 828. In addition, the main board 811 is connected to the communication unit 801 via the communication control unit 826.

The CPU 812 functions as a system control unit that controls the entire authentication server 800. Processing of the authentication server 800 is implemented by the CPU 812 loading a program stored in the ROM 813, onto the RAM 814, and executing the program.

The ROM 813 stores control programs to be executed by the CPU 812, and an embedded OS program. By executing a corresponding program under an embedded OS, the CPU 812 performs software control such as scheduling or task switch.

The RAM 814 includes an SRAM. The RAM 814 stores various types of data such as variables for program control, setting values registered by the user, and management data for managing the authentication server 800. The RAM 814 can be used as various working buffers.

The image memory 815 includes a memory such as a DRAM. The image memory 815 temporarily stores image data received via the communication unit 801, and image data read out from the data accumulation unit 823, and makes the image data processable by the CPU 812.

The data accumulation unit 823 includes a storage medium such as a solid state drive (SSD), for example, and holds stored data even if the power of the authentication server 800 is turned off. As another example of the data accumulation unit 823, another storage medium such as an HDD or a nonvolatile memory may be used.

Similarly to the main board 211, each function of the main board 811 that is to be described here may be implemented by whichever of hardware and software.

The display unit 802 electronically controls display content, and executes control for receiving operation input performed by the user, and displaying a status.

In response to operation input received from the user, the operation unit 803 outputs an electrical signal corresponding to the operation input, to the CPU 812.

The authentication server 800 can perform data communication with the access point 700 (or another device) via the communication unit 801 using the communication control unit 826. For example, the authentication server 800 converts data into a packet and transmits the packet to another external device.

The communication unit 801 receives a packet from another external device, converts the packet into original data, and outputs the original data to the CPU 812. The communication unit 801 can execute data (packet) communication in a wired LAN (Ethernet) system complying with the IEEE 802.3 series standard, for example.

Hereinafter, wireless infrastructure connection will be described. In the wireless infrastructure connection, by connecting communication apparatuses (for example, the information processing apparatus 200 and the MFP 300) that perform communication with each other, to the external access point 700 for controlling a network, communication between the communication apparatuses is performed via the access point 700. In other words, communication between the communication apparatuses is executed via a network constructed by the access point 700. The MFP 300 operating in the wireless infrastructure connection operates as a station in connection or communication with the access point 700.

In the wireless infrastructure connection, by transmitting a device probe request (Probe Request), each device (for example, the MFP 300) searches for the access point 700. If each device receives a device probe response (Probe Response) as beacon information transmitted by the access point 700, each device displays a service set identifier (SSID) of the access point 700 that is included in the received device probe response, and receives the selection of the access point 700. Then, by transmitting a connection request to the access point 700 selected by the user, connection with the access point 700 is established. Communication between the information processing apparatus 200 and the MFP 300 via the access point 700 thereby becomes executable.

A plurality of communication apparatuses may be connected to mutually-different access points 700. In this case, communication between the communication apparatuses becomes executable by data transfer being performed between the different APs. In this case, it is sufficient that commands and parameters that comply with a Wi-Fi standard are used as commands and parameters to be transmitted and received in communication between the communication apparatuses.

In addition, the access point 700 determines a frequency band and a frequency channel that are to be used in communication with another device. For example, the access point 700 can select a frequency band to be used, out of the 5 GHz band and the 2.4 GHz band, and a frequency channel to be used in the selected frequency band.

Here, when the information processing apparatus 200 and the MFP 300 connect to a network constructed by the access point 700, authentication is performed by the access point 700 in some cases. Thus, the information processing apparatus 200 and the MFP 300 connect to a network constructed by the access point 700, after executing a setting for authentication being performed in accordance with an authentication method supported by the network constructed by the access point 700. As described above, authentication methods include the Personal method. Furthermore, as an authentication method supported by both of a wireless LAN and a wired LAN, there is the EAP method of authenticating a communication apparatus connecting to a network, using an authentication server supporting the IEEE 802.1X/EAP. Aside from authentication processing executed in a wireless connection procedure as described above, authentication processing is sometimes executed between an information processing apparatus and a printing apparatus in communication executed via established wireless connection.

As described above, if the MFP 300 searches for the access point 700 by transmitting a device probe request, and receives a device probe response from the access point 700 as beacon information, the MFP 300 displays an SSID included in the received device probe response.

Nevertheless, because the conventional MFP 300 displays all SSIDs indicating discovered access points 700, the user has been unable to easily recognize an authentication method supported by the access points 700 corresponding to the displayed SSIDs, and an enabled authentication method. For this reason, in a case where the user wirelessly connects the MFP 300, the user has been unable to easily select the access point 700 in which an authentication method desired to be used is enabled, from among the access points 700 corresponding to the displayed SSIDs.

In view of the foregoing, in the present exemplary embodiment, the MFP 300 displays, in a distinguishable manner, a setting screen to be operated in a case where wireless connection of the MFP 300 is established using a specific authentication method, and a setting screen to be operated in a case where wireless connection of the MFP 300 is established using an authentication method other than the specific authentication method.

In other words, the MFP 300 differentiates a procedure of operations to be received from the user in a case where wireless connection of the MFP 300 is established using a specific authentication method, and a procedure of operations to be received from the user in a case where wireless connection of the MFP 300 is established using an authentication method other than the specific authentication method.

Then, in a case where an operation is performed by the user on a setting screen to be operated in a case where wireless connection of the MFP 300 is established using a specific authentication method, the MFP 300 displays only an SSID indicating the access point 700 in which the specific authentication method is enabled, among SSIDs of the discovered access points 700. In other words, the MFP 300 does not display an SSID of the access point 700 in which an authentication method other than the specific authentication method is enabled. In a case where an operation is performed on a setting screen to be operated in a case where wireless connection of the MFP 300 is established using an authentication method other than the specific authentication method, the MFP 300 displays only an SSID indicating the access point 700 in which an authentication method other than the specific authentication method is enabled, among SSIDs of the discovered access points 700. In other words, the MFP 300 does not display the access point 700 in which the specific authentication method is enabled.

With this configuration, it becomes less likely that all SSIDs indicating the discovered access points 700 are displayed, and the user can easily recognize an authentication method supported by the access point 700 corresponding to a displayed SSID. Thus, in a case where the user wirelessly connects the MFP 300, the user can easily select the access point 700 in which an authentication method desired to be used is enabled.

In the present exemplary embodiment, the specific authentication method is the above-described IEEE 802.1X/EAP authentication method or the Personal method. In a case where the specific authentication method is the IEEE 802.1X/EAP authentication method, an authentication method other than the specific authentication method is the Personal method. In a case where the specific authentication method is the Personal method, an authentication method other than the specific authentication method is the IEEE 802.1X/EAP authentication method. Hereinafter, processing of wirelessly connecting the MFP 300 to the access point 700 in which the IEEE 802.1X/EAP authentication method is enabled will be referred to as EAP setup processing. Processing of wirelessly connecting the MFP 300 to the access point 700 supporting the Personal method will be referred to as Personal setup processing.

FIG. 9 is a flowchart illustrating a flow of processing to be executed by the MFP 300 in the EAP setup processing. The processing of the flowchart illustrated in FIG. 9 is implemented by the CPU 311 loading a program stored in the ROM, onto the RAM, and executing the program, for example. In addition, the processing of the flowchart illustrated in FIG. 9 is started in response to a predetermined operation being performed on the operation display unit 302.

In a case where the MFP 300 is connected to the access point 700 in which the IEEE 802.1X/EAP authentication method is enabled, the EAP setup processing is to be started after information necessary for authentication is set in the MFP 300. The following processing in steps S901 and S902 indicates processing of setting information necessary for authentication, in the MFP 300, and the processing in step S903 indicates the EAP setup processing.

Figure 10A:
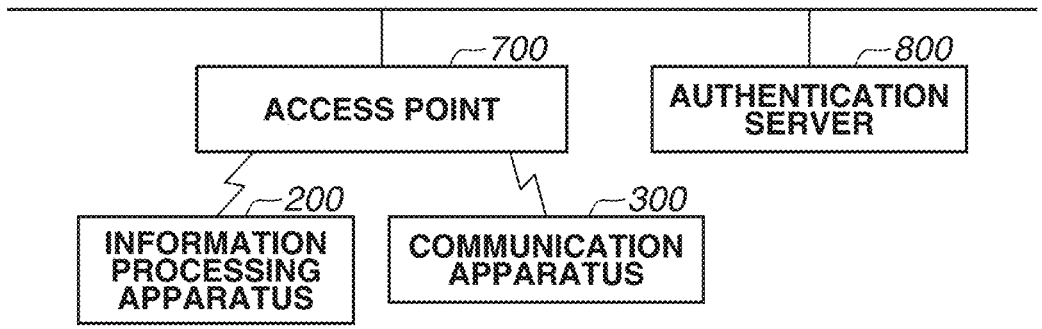
FIGS. 10A to 10C are diagrams each illustrating a connection method of an information processing apparatus and a communication apparatus.
Figure 10B:
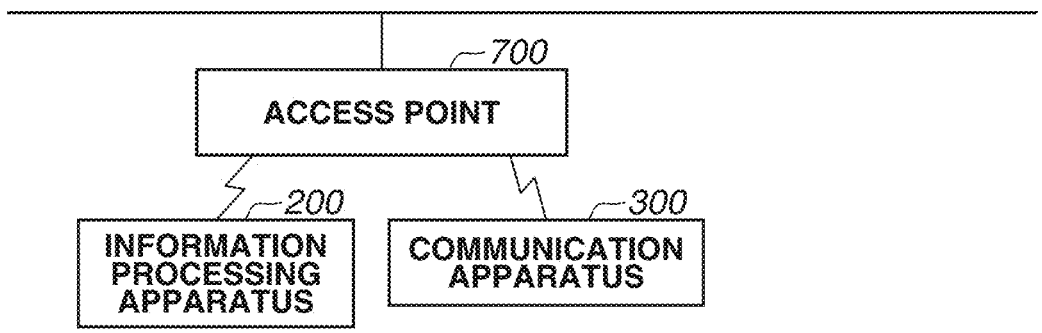
Figure 10C:
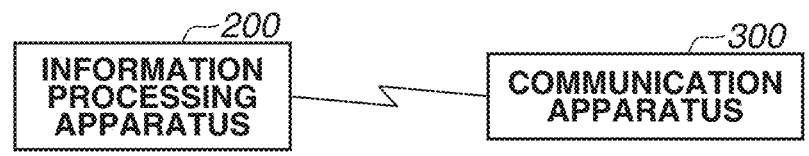

In step S901, the MFP 300 establishes connection with the information processing apparatus 200 using a connection method that does not use the IEEE 802.1X/EAP authentication method. Specifically, for example, in a configuration as illustrated in FIG. 10C, the MFP 300 responds to a connection request from the information processing apparatus 200, and establishes direct connection with the information processing apparatus 200. As another configuration, as illustrated in FIG. 10B, by the MFP 300 connecting to the access point 700 that does not use the IEEE 802.1X/EAP authentication method (uses the Personal method), communication with the information processing apparatus 200 may be executed via the access point 700.

In step S902, the MFP 300 receives information regarding the IEEE 802.1X/EAP authentication method from the information processing apparatus 200, and executes a setting regarding the IEEE 802.1X/EAP authentication method using the information. The information regarding the IEEE 802.1X/EAP authentication method is transmitted via the connection established in step S901.

The information regarding the IEEE 802.1X/EAP authentication method is information that is based on a user operation performed on a setting screen displayed on the information processing apparatus 200. The detailed description will be given with reference to FIGS. 11A-11G and 11J-11K.

FIGS. 11A to 11G each illustrate an example of a setting screen of the MFP 300 that is to be displayed on the information processing apparatus 200. The setting screen is displayed by a WEB browser or an application operating on the information processing apparatus 200, communicating with a HyperText Transfer Protocol (HTTP) server operating on the MFP 300. A screen to be described below may be displayed based on a waiting response to an HTTP request in USB communication using the USB communication control unit 320 of the MFP 300.

FIG. 11A illustrates an initial screen of a setting menu. An MFP state 1101, a main body setting 1102, a LAN setting 1103, and a security setting 1104 are displayed on the initial screen.

A screen illustrated in FIG. 11B is displayed in a case where the security setting 1104 is selected on the initial screen illustrated in FIG. 11A. A Secure Socket Layer/Transport Layer Security (SSL/TLS) setting 1111 and an IEEE 802.1X/EAP setting 1112 are displayed on the screen.

A screen illustrated in FIG. 11C is displayed in a case where the IEEE 802.1X/EAP setting 1112 is selected on the screen illustrated in FIG. 11B. An authentication method 1121, a setting 1122 of a key and a certificate, and an enabling/disabling setting 1123 of IEEE 802.1X/EAP are displayed on the screen.

A screen illustrated in FIG. 11D is displayed in a case where the authentication method 1121 is selected on the screen illustrated in FIG. 11C. An authentication method EAP-TLS 1131, an authentication method EAP-TTLS 1132, and an authentication method PEAP 1133, as types of the IEEE 802.1X/EAP authentication method, a user name (login name) entry field 1134, and a password entry field 1135 are displayed on the screen. Among the authentication methods 1131 to 1133, a selected authentication method is set in the MFP 300 as an authentication method to be used in authentication that uses the IEEE 802.1X/EAP authentication method. In addition, a user name and a password entered into the entry fields 1134 to 1135 are set in the MFP 300 as a user name and a password that are to be used at the time of IEEE 802.1X/EAP authentication.

Furthermore, in the case of registering, into the MFP 300, a key and a certificate that are to be used when authentication is executed using the IEEE 802.1X/EAP authentication method, the setting 1122 of a key and a certificate is selected on the screen illustrated in FIG. 11C. After that, by selecting upload 1141 of a key and a certificate on a screen illustrated in FIG. 11E, a screen illustrated in FIG. 11F is displayed. On the screen, a file is selected as a certificate and entered into an entry field 1161, a password is entered into an entry field 1162 as a key, and then, upload 1163 is selected. The upload (transmission) of the key and the certificate to the MFP 300 is thereby completed.

By selecting a deletion setting 1142 of a key and a certificate on the screen illustrated in FIG. 11E, a certificate stored in the MFP 300 can be deleted. By selecting a confirmation setting 1143 of a key and a certificate on the screen illustrated in FIG. 11E, a list of certificates stored in the MFP 300 can be displayed.

A screen illustrated in FIG. 11G is displayed by the enabling/disabling setting 1123 of IEEE 802.1X/EAP being selected on the screen illustrated in FIG. 11C. By an enabled setting 1151 or a disabled setting 1152 being selected on the screen, the IEEE 802.1X/EAP authentication method of the MFP 300 is enabled or disabled. A state in which the IEEE 802.1X/EAP authentication method is enabled in the MFP 300 refers to a state in which authentication that uses the IEEE 802.1X/EAP authentication method and authentication that uses the Personal method are executable. A state in which the IEEE 802.1X/EAP authentication method is disabled in the MFP 300 refers to a state in which authentication that uses the IEEE 802.1X/EAP authentication method is inexecutable, and authentication that uses the Personal method is executable.

By user operations being performed on the screens illustrated in FIGS. 11A to 11G, in step S902, the MFP 300 receives information regarding authentication that is to be used in the IEEE 802.1X/EAP authentication method, and a setting regarding the EAP is executed in the MFP 300 based on the information. In other words, the information regarding authentication includes information suitable for each method of authentication complying with the IEEE 802.1X standard, among an authentication method to be used at the time of IEEE 802.1X/EAP authentication, a user name and password that are to be used at the time of authentication, and a key and a certificate that are to be used at the time of authentication. By these pieces of information regarding authentication being authenticated by the authentication server 800, the MFP 300 can connect to a network supporting the IEEE 802.1X/EAP authentication method, and being constructed by the access point 700.

In the present exemplary embodiment, as a connection state of the MFP 300 and the information processing apparatus 200, an enabled state (ON state) or a disabled state (OFF state) is managed. For example, in the MFP 300, by controlling the wireless communication unit 307 or the wired LAN communication unit 321, switching of enabled connection and control of communication can be performed.

In step S903, the MFP 300 connects to a network in which the IEEE 802.1X/EAP authentication method is enabled, and which has been set up by the access point 700. In other words, the MFP 300 establishes connection with an access point in which the IEEE 802.1X/EAP authentication method is enabled. Thus, as illustrated in FIG. 10A, in a network supporting the IEEE 802.1X/EAP authentication method to be performed by cooperation of the authentication server 800 and the access point 700, communication between the information processing apparatus 200 and the MFP 300 is executed.

As described above, in the wireless infrastructure connection, if the MFP 300 searches for the access point 700 and receives a device probe response as beacon information, an SSID of the access point 700 that is included in the device probe response is displayed. The access point 700 to which the MFP 300 then connects in step S903 is an access point 700 selected by the user from among access points 700 displayed on a screen of the MFP 300. Here, FIGS. 12A to 12H illustrate screens to be displayed in the Personal setup processing. FIGS. 12I to 12M illustrate screens to be displayed in the EAP setup processing.

First of all, the Personal setup processing to be performed by the user will be described with reference to the screens to be displayed in the Personal setup processing.

Figure 12A:
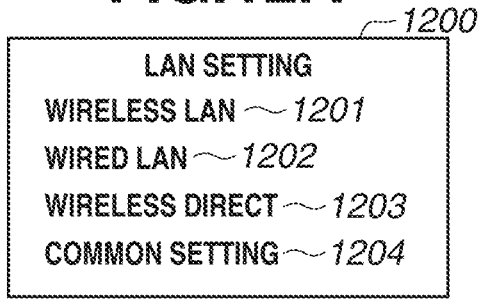
FIGS. 12A to 12N each illustrate an example of an operation display unit related to setup processing of a communication apparatus.

A screen 1200 illustrated in FIG. 12A is a screen displayed when a LAN setting is selected on the LCD 408 illustrated in FIG. 4B, and is a screen on which a change of a LAN setting is executable. A wireless LAN setting 1201, a wired LAN setting 1202, a wireless direct setting 1203, and a common setting 1204 are displayed on the screen 1200. In the Personal setup processing, the user first selects the wireless LAN setting 1201 on the screen 1200.

Figure 12B:
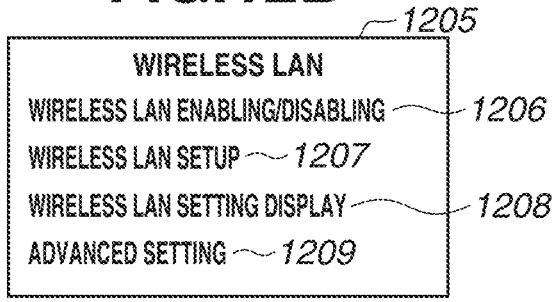

A screen 1205 illustrated in FIG. 12B is a screen displayed when the wireless LAN setting 1201 is selected on the screen 1200, and is a screen on which a change of a wireless LAN setting is executable. The screen 1205 includes wireless LAN enabling/disabling 1206, wireless LAN setup 1207, wireless LAN setting display 1208, and an advanced setting 1209. The user selects the wireless LAN setup 1207 on the screen 1205.

Figure 12C:
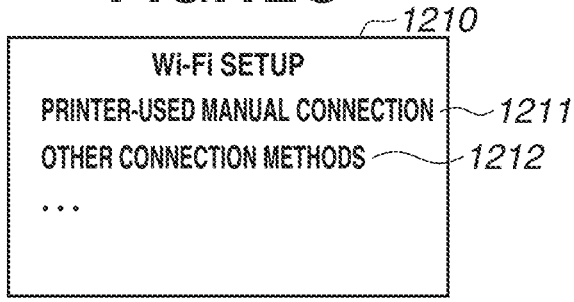

A screen 1210 illustrated in FIG. 12C is a Wi-Fi setup screen displayed when the wireless LAN setup 1207 is selected on the screen 1205. The Wi-Fi setup screen 1210 includes a manual connection setting 1211 on a printer that executes router search (printer-used manual connection setting), and other connection methods 1212. Here, the other connection methods 1212 include an AirStation One-Touch Secure System (AOSS), Wi-Fi Protected Setup (WPS) (PIN code designation method, push button method), a connection operation from an external device such as a smartphone, and an operation such as direct designation of an SSID. The user selects the printer-used manual connection setting 1211 or the other connection methods 1212 on the screen 1210.

Figure 12D:
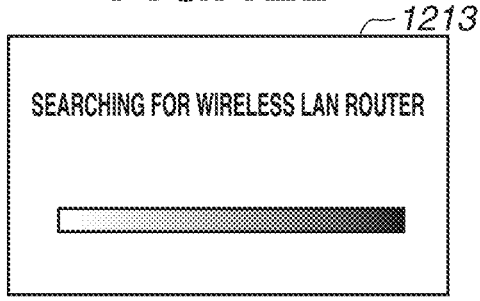

A screen 1213 illustrated in FIG. 12D is a screen displayed when the user selects the printer-used manual connection setting 1211 or the other connection methods 1212 on the screen 1210, and is a screen indicating that search for the access point 700 is being executed.

Figure 12E:
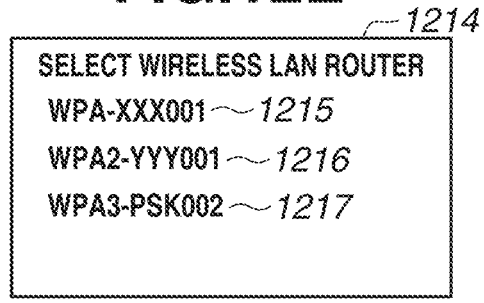

A screen 1214 illustrated in FIG. 12E is a screen to which the screen transitions from the screen 1213 after the execution of search for the access point 700. SSIDs displayed as search results indicating the discovered access points 700 are an SSID 1215, an SSID 1216, and an SSID 1217, and correspond to character strings "WPA-XXX001", "WPA2-YYY001", and "WPA3-PSK002", respectively. The SSID 1215, the SSID 1216, and the SSID 1217 are SSIDs of the access points 700 in which the Personal method is enabled. An SSID manual entry button (not illustrated) may be provided on the screen 1214. In a case where the SSID manual entry button is pressed, entry fields for an SSID and a password are displayed. In a case where the user enters an SSID and a password, search for an access point 700 corresponding to the entered SSID is executed. The user selects a specific SSID desired to be used, on the screen 1214. For example, the user selects one SSID from among the displayed SSID 1215, the SSID 1216, and the SSID 1217.

Figure 12F:
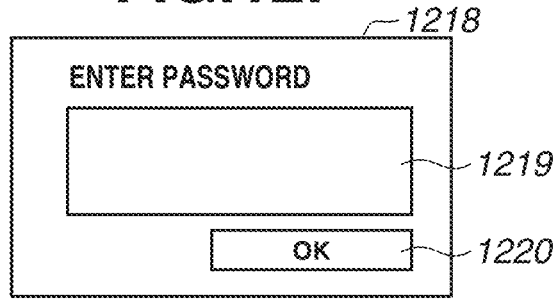

A screen 1218 illustrated in FIG. 12F is a password entry screen displayed in a case where a specific SSID is selected on the screen 1214. An entry field 1219 for entering a password, and an OK button 1220 for reflecting the entered password are displayed on the screen 1218. The user enters a password corresponding to a selected SSID, into the entry field 1219 on the screen 1218.

Figure 12G:
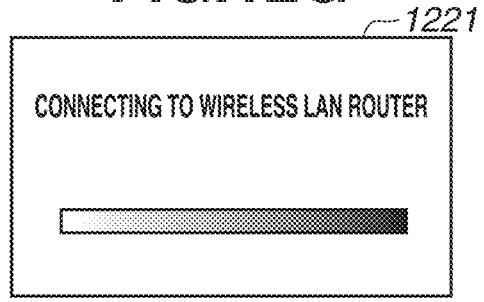

A screen 1221 illustrated in FIG. 12G is displayed in a case where a password is entered into the entry field 1219 and the OK button 1220 is selected on the screen 1218.

Figure 12H:
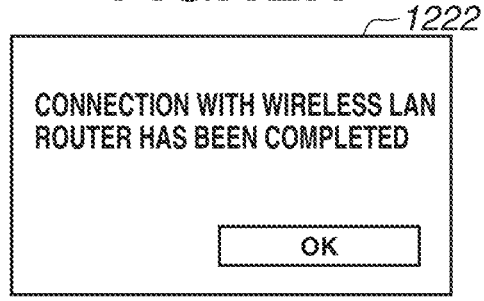

A screen 1222 illustrated in FIG. 12H is a screen to which the screen transitions from the screen 1221 after the MFP 300 has connected to the selected access point 700.

Next, the EAP setup processing to be performed by the user will be described with reference to the screens to be displayed in the EAP setup processing. The user selects the advanced setting 1209 on the screen 1205 illustrated in FIG. 12B.

Figure 12I:
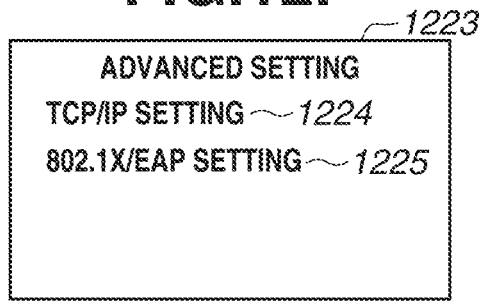

A screen 1223 illustrated in FIG. 12I is an advanced setting screen displayed when the advanced setting 1209 is selected on the screen 1205. The screen 1223 includes a Transmission Control Protocol/Internet Protocol (TCP/IP) setting 1224 and an IEEE 802.1X/EAP setting 1225.

Figure 12L:
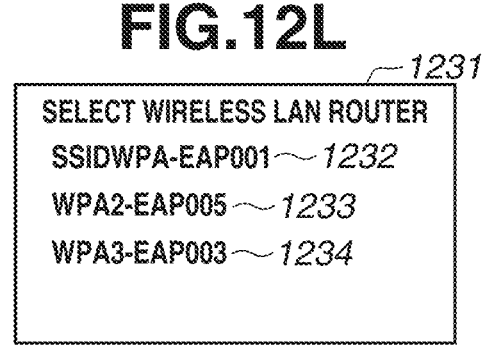
Figure 12J:
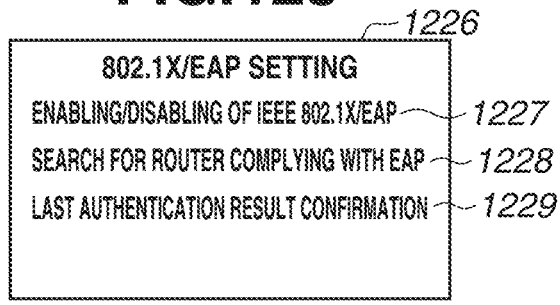

A screen 1226 illustrated in FIG. 12J is an IEEE 802.1X/EAP setting screen displayed when the IEEE 802.1X/EAP setting 1225 is selected on the screen 1223. The IEEE 802.1X/EAP setting screen 1226 includes an enabling/disabling setting 1227 of the IEEE 802.1X/EAP authentication method, search 1228 for a router complying with the EAP, and last authentication result confirmation 1229. While the enabling/disabling setting of the IEEE 802.1X/EAP authentication method is settable also on the operation panel 302 of the MFP 300, as described above, the enabling/disabling setting is settable also on the screen illustrated in FIG. 11G that is displayed on the display unit 202 of the information processing apparatus 200. The user selects the search 1228 for a router complying with the EAP, on the screen 1226.

Figure 12M:
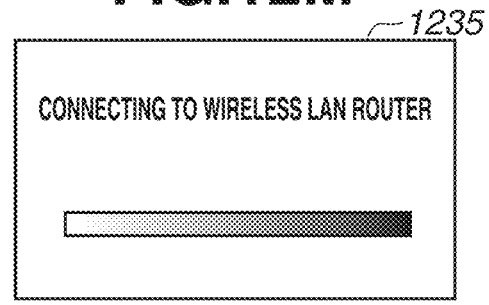
Figure 12K:
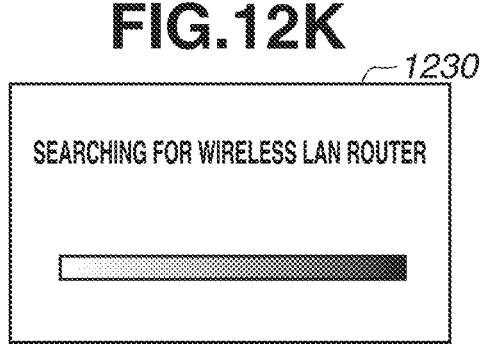

A screen 1230 illustrated in FIG. 12K is a screen displayed when the search 1228 for a router complying with the EAP is selected on the screen 1226, and is a screen displaying that search for the access point 700 supporting the IEEE 802.1X/EAP is being executed.

A screen 1231 illustrated in FIG. 12L is a screen to which the screen transitions from the screen 1230 after the search for the access point 700 has ended. SSIDs displayed as search results indicating the discovered access points 700 are an SSID 1232, an SSID 1233, and an SSID 1234, and correspond to character strings "SSIDWPA-EAP001", "WPA2-EAP005", and "WPA3-EAP003", respectively. The SSID 1232, the SSID 1233, and the SSID 1234 are SSIDs of the access points 700 in which the IEEE 802.1X/EAP authentication method is enabled. An SSID manual entry button (not illustrated) may be provided on the screen 1231. In a case where the SSID manual entry button is pressed, entry fields for an SSID and a password are displayed. In a case where the user enters an SSID and a password, search for an access point 700 corresponding to the entered SSID is executed. The user selects a specific SSID on the screen 1231. For example, the user selects one SSID from among the displayed SSID 1232, the SSID 1233, and the SSID 1234.

A screen 1235 illustrated in FIG. 12M is a screen displayed when a specific SSID is selected on the screen 1231.

Figure 12N:
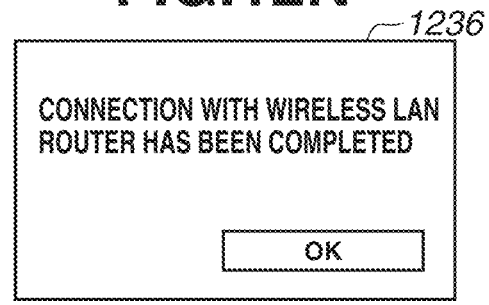

A screen 1236 illustrated in FIG. 12N is a screen to which the screen transitions from the screen 1235 after the MFP 300 has connected to the access point 700.

As described above, in a case where the user performs the Personal setup processing, the user selects the wireless LAN setup 1207 on the screen 1205 illustrated in FIG. 12B, and selects the printer-used manual connection setting 1211 or the other connection methods 1212 on the screen 1210. With this configuration, the MFP 300 displays, on the screen 1214, only SSIDs of the access points 700 supporting the Personal method, and does not display, on the screen 1214, an SSID of the access point 700 other than the access points 700 supporting the Personal method. In other words, the MFP 300 does not display, on the screen 1214, an SSID of the access point 700 supporting the EAP method.

In a case where the user performs the EAP setup processing, the user selects the advanced setting 1209 on the screen 1205, selects the 802.1X/EAP setting 1225 on the screen 1223 illustrated in FIG. 12I, and selects the search 1228 for a router complying with the EAP, on the screen 1226. With this configuration, the MFP 300 displays, on the screen 1231, only SSIDs of the access points 700 supporting the EAP method, and does not display, on the screen 1231, an SSID of the access point 700 other than the access points 700 supporting the EAP method. In other words, the MFP 300 does not display, on the screen 1231, an SSID of the access point 700 supporting the Personal method.

Figure 13:
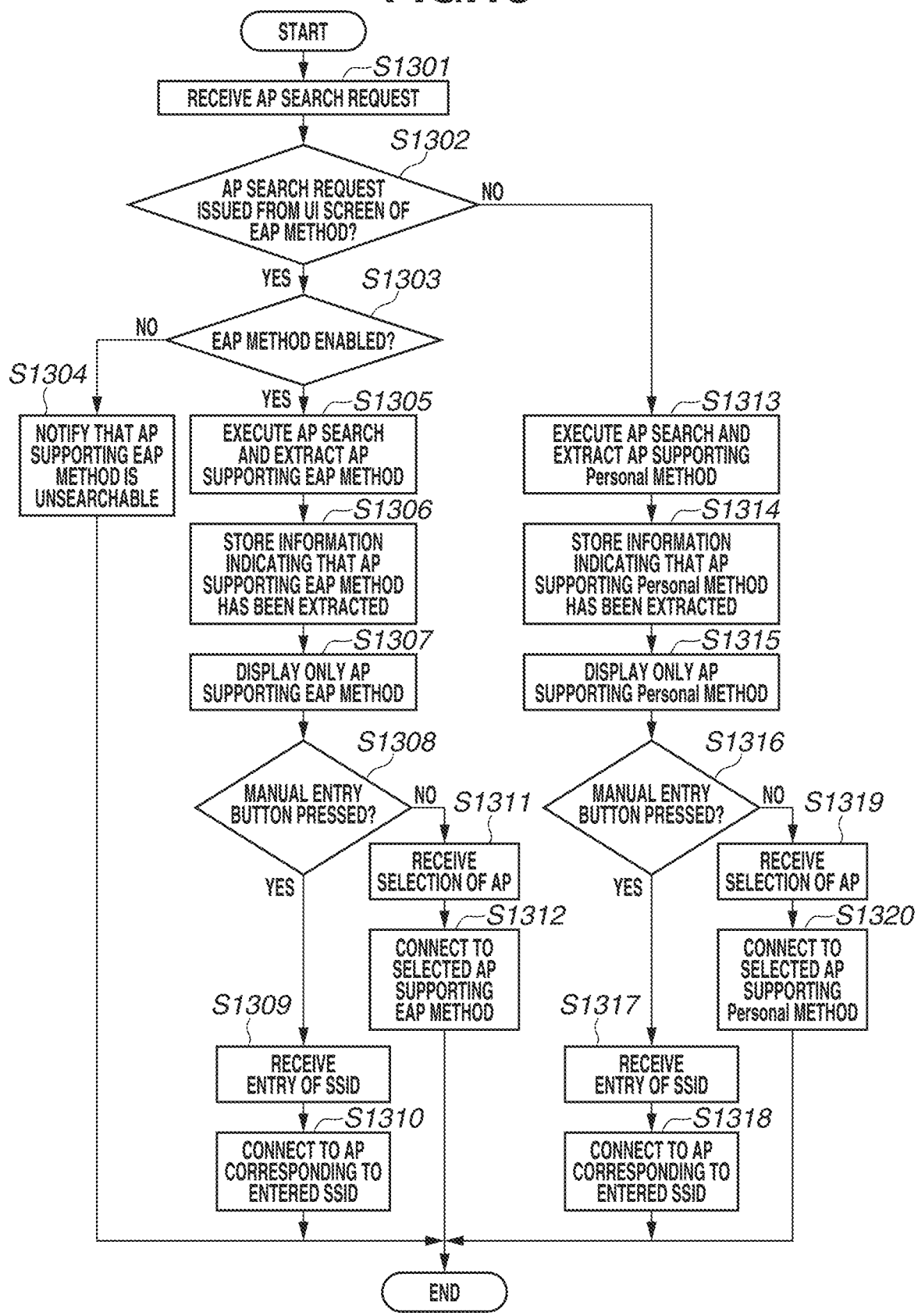
FIG. 13 is a flowchart related to setup processing of a communication apparatus.

Next, a flow of processing to be executed by the MFP 300 in the EAP setup processing or the Personal setup processing of the MFP 300 will be described with reference to in a flowchart in FIG. 13. The processing of the flowchart illustrated in FIG. 13 is implemented by the CPU 311 loading a program stored in the ROM, onto the RAM, and executing the program, for example. Before the execution of the EAP setup processing, information regarding authentication to be used in authentication that uses the IEEE 802.1X/EAP authentication method needs to be preset in the MFP 300 as described above with reference to FIG. 9. In a case where the information regarding authentication is not set in the MFP 300, the IEEE 802.1X/EAP authentication method might fail.

In step S1301, the CPU 311 receives a search instruction of the access point 700 (AP search request instruction) that has been issued by the user. Specifically, the search instruction of the access point 700 indicates that the user has selected the printer-used manual connection setting 1211 or the other connection methods 1212 on the screen 1210 illustrated in FIG. 12C, or indicates that the user has selected the search 1228 for a router complying with the EAP, on the screen 1226.

In step S1302, the CPU 311 determines whether the user has operated a setting screen (UI screen) to be operated in a case where wireless connection of the MFP 300 is established using the IEEE 802.1X/EAP authentication method being a specific authentication method. Specifically, in a case where the user has selected the search 1228 for a router complying with the EAP, on the screen 1226 illustrated in FIG. 12J, it is determined that the user has operated a setting screen to be operated in a case where wireless connection of the MFP 300 is established using the IEEE 802.1X/EAP authentication method (YES in step S1302). In a case where the user has selected the printer-used manual connection setting 1211 or the other connection methods 1212 on the screen 1210 illustrated in FIG. 12C, it is determined that the user has not operated a setting screen to be operated in a case where wireless connection of the MFP 300 is established using the IEEE 802.1X/EAP authentication method (NO in step S1302). In other words, in a case where the user has issued a search instruction of the access point 700 in which the IEEE 802.1X/EAP authentication method is enabled, it is determined in step S1302 that the user has operated a setting screen to be operated in a case where wireless connection of the MFP 300 is established using the IEEE 802.1X/EAP authentication method (YES in step S1302). In a case where the user has issued a search instruction of the access point 700 in which an authentication method other than the IEEE 802.1X/EAP authentication method is enabled, it is determined in step S1302 that the user has not operated a setting screen to be operated in a case where wireless connection of the MFP 300 is established using the IEEE 802.1X/EAP authentication method (NO in step S1302). In a case where it is determined that the user has operated a setting screen to be operated in a case where wireless connection of the MFP 300 is established using the IEEE 802.1X/EAP authentication method (YES in step S1302), the processing proceeds to step S1303. In a case where it is determined that the user has not operated a setting screen to be operated in a case where wireless connection of the MFP 300 is established using the IEEE 802.1X/EAP authentication method (NO in step S1302), the processing proceeds to step S1313. It may be determined in the determination that the user has operated a setting screen to be operated in a case where wireless connection of the MFP 300 is established using the IEEE 802.1X/EAP authentication method (YES in step S1302), also in a case where a similar setting screen is displayed on the information processing apparatus 200, and the MFP 300 has received, via a communication path, information indicating that the user has operated a setting screen to be operated in a case where wireless connection is established using the IEEE 802.1X/EAP authentication method. Furthermore, it may be determined in the determination that the user has operated a setting screen to be operated in a case where wireless connection of the MFP 300 is established using the IEEE 802.1X/EAP authentication method (YES in step S1302), also in a case where an instruction of a search request issued using the IEEE 802.1X/EAP authentication method has been received from the information processing apparatus 200.

In step S1303, the CPU 311 determines whether the IEEE 802.1X/EAP authentication method is enabled. Specifically, the CPU 311 determines whether an operation for enabling the IEEE 802.1X/EAP authentication method of the MFP 300 has been performed on the screen illustrated in FIG. 11G, and a setting for enabling the IEEE 802.1X/EAP authentication method has been executed in the MFP 300. In a case where it is determined that the IEEE 802.1X/EAP authentication method is enabled (YES in step S1303), the processing proceeds to step S1305. In a case where it is determined that the IEEE 802.1X/EAP authentication method is disabled (NO in step S1303), the processing proceeds to step S1304. In a case where the IEEE 802.1X/EAP authentication method of the MFP 300 is disabled on the screen illustrated in FIG. 11G or 12J, the search 1228 for a router complying with the EAP may be grayed out and brought into an unselectable state on the screen illustrated in FIG. 12J. In this case, a start instruction of setup processing of the MFP 300 that uses the IEEE 802.1X/EAP authentication method is not issued, and it is not determined in step S1302 that the user has operated a setting screen to be operated in a case where wireless connection of the MFP 300 is established using the IEEE 802.1X/EAP authentication method. Thus, the processing in steps S1303 to S1312 is omitted.

In step S1304, the CPU 311 notifies that a search for the access point 700 in which the IEEE 802.1X/EAP authentication method is enabled is inexecutable. In this case, a screen 1171 for prompting the user to enable the IEEE 802.1X/EAP authentication method of the MFP 300 is displayed as illustrated in FIG. 11J. Even if the IEEE 802.1X/EAP authentication method is disabled, the CPU 311 may execute search for the access point 700. In this case, even if a list of the access points 700 discovered by the search includes the access point 700 in which the IEEE 802.1X/EAP authentication method is enabled, the CPU 311 may avoid displaying the access point 700. Alternatively, in a case where the access point 700 in which the IEEE 802.1X/EAP authentication method is enabled has been discovered, the CPU 311 displays the discovered access point 700, but the MFP 300 may avoid executing connection processing with the access point 700 in which the IEEE 802.1X/EAP authentication method is enabled, even if the user has selected the discovered access point 700.

In step S1305, the CPU 311 executes search for a neighboring access point 700. In the search, not only the access point 700 in which the IEEE 802.1X/EAP authentication method is enabled, but also the access point 700 not supporting the IEEE 802.1X/EAP authentication method (supporting the Personal method) can be discovered. Then, the CPU 311 executes extraction of one or a plurality of access points 700 supporting the IEEE 802.1X/EAP authentication method, from among one or a plurality of access points 700 discovered by the search. Alternatively, the CPU 311 executes exclusion (filtering) of one or a plurality of access points 700 supporting the Personal method. In step S1305, the screen 1230 illustrated in FIG. 12K is displayed.

In step S1306, the CPU 311 stores information indicating that the extraction of the access point 700 in which the IEEE 802.1X/EAP authentication method is enabled has been executed.

In step S1307, the CPU 311 displays one or a plurality of access points 700 supporting the IEEE 802.1X/EAP authentication method that has been extracted in step S1305, on the operation display unit 302 as a list. At this time, the CPU 311 does not display, on the operation display unit 302, an SSID of the access point 700 in which an authentication method other than the IEEE 802.1X/EAP authentication method is enabled. At this time, for example, the screen 1231 illustrated in FIG. 12L that indicates a list of SSIDs of the access points 700 in which the IEEE 802.1X/EAP authentication method is enabled is displayed.

In step S1308, the CPU 311 determines whether the user has operated an SSID manual entry button (not illustrated) displayed in a case where a scroll operation has been executed on the screen 1231 illustrated in FIG. 12L, for example. In a case where it is determined that the user has operated the SSID manual entry button (YES in step S1308), the processing proceeds to step S1309. In a case where it is determined that the user has not operated the SSID manual entry button (NO in step S1308), the processing proceeds to step S1311.

In step S1309, the CPU 311 displays entry fields (not illustrated) for an SSID and a password, and receives the entry of an SSID and a password from the user.

In step S1310, the CPU 311 executes search for a neighboring access point 700 again, and determines whether discovered access points 700 include the access point 700 corresponding to the entered SSID. At this time, the CPU 311 may determine whether access points 700 discovered by the search executed in step S1305 include the access point 700 corresponding to the entered SSID, without executing search again. Then, in a case where the access points 700 include the access point 700 corresponding to the entered SSID, the CPU 311 connects to the access point 700 corresponding to the entered SSID.

In a case where the access points 700 do not include the access point 700 corresponding to the entered SSID, the CPU 311 may notify that the access point 700 corresponding to the entered SSID has not been discovered, and end the processing of this flowchart. In a case where the access point 700 corresponding to the SSID entered in step S1309 has been discovered, but the access point 700 corresponding to the entered SSID is not an access point 700 in which the IEEE 802.1X/EAP authentication method is enabled, the CPU 311 does not connect to the access point 700 corresponding to the entered SSID. Then, the CPU 311 may notify that connection has failed.

In step S1311 to which the processing proceeds in a case where it is determined that the user has not operated the SSID manual entry button (NO in step S1308), the CPU 311 receives the selection of any access point 700 from the list displayed on the operation display unit 302. Specifically, the CPU 311 receives the selection of one SSID from among the SSIDs 1232 to 1234 of the access points 700 in which the IEEE 802.1X/EAP authentication method is enabled that are displayed on the screen 1231 illustrated in FIG. 12L, for example.

In step S1312, the CPU 311 connects to the access point 700 in which the IEEE 802.1X/EAP authentication method is enabled that corresponds to the selected SSID. In step S1312, the screen 1235 illustrated in FIG. 12M is displayed, and in a case where connection with the access point 700 has been completed, the screen 1236 illustrated in FIG. 12N is displayed.

The processing in steps S1313 to S1320 is processing to be performed in a case where the user has issued a search instruction of the access point 700 in which the Personal method is enabled.

In step S1313, the CPU 311 executes search for a neighboring access point 700. In the search, not only the access point 700 supporting the Personal method, but also the access point 700 not supporting the Personal method (supporting the IEEE 802.1X/EAP authentication method) can be discovered. Then, the CPU 311 executes extraction of one or a plurality of access points 700 supporting the Personal method, from among one or a plurality of access points discovered by the search. Alternatively, the CPU 311 executes exclusion (filtering) of one or a plurality of access points 700 supporting the IEEE 802.1X/EAP authentication method. In step S1313, the screen 1213 illustrated in FIG. 12D is displayed.

In step S1314, the CPU 311 stores information indicating that the extraction of the access point 700 supporting the Personal method has been executed.

In step S1315, the CPU 311 displays one or a plurality of access points 700 supporting the Personal method that has been extracted in step S1313, on the operation display unit 302 as a list. At this time, the CPU 311 does not display, on the operation display unit 302, an SSID of the access point 700 in which an authentication method other than the Personal method is enabled. At this time, for example, the screen 1214 illustrated in FIG. 12E that indicates a list of SSIDs of the access points 700 in which the Personal method is enabled is displayed.

In step S1316, the CPU 311 determines whether the user has operated an SSID manual entry button (not illustrated) displayed in a case where a scroll operation has been executed on the screen 1214 illustrated in FIG. 12E, for example. In a case where it is determined that the user has operated the SSID manual entry button (YES in step S1316), the processing proceeds to step S1317. In a case where it is determined that the user has not operated the SSID manual entry button (NO in step S1316), the processing proceeds to step S1319.

In step S1317, the CPU 311 displays entry fields (not illustrated) for an SSID and a password, and receives the entry of an SSID and a password from the user.

In step S1318, the CPU 311 executes search for a neighboring access point 700 again, and determines whether discovered access points 700 include the access point 700 corresponding to the entered SSID. At this time, the CPU 311 may determine whether access points 700 discovered by the search executed in step S1313 include the access point 700 corresponding to the entered SSID, without executing search again. Then, in a case where the access points 700 include the access point 700 corresponding to the entered SSID, the CPU 311 connects to the access point 700 corresponding to the entered SSID.

In a case where the access points 700 do not include the access point 700 corresponding to the entered SSID, the CPU 311 may notify that the access point 700 corresponding to the entered SSID has not been discovered, and end the processing of this flowchart. In a case where the access point 700 corresponding to the SSID entered in step S1317 has been discovered, but the access point 700 corresponding to the entered SSID is not an access point 700 supporting the Personal method, the CPU 311 does not connect to the access point 700 corresponding to the entered SSID. Then, the CPU 311 may notify that connection has failed.

In step S1319 to which the processing proceeds in a case where it is determined that the user has not operated the SSID manual entry button (NO in step S1316), the CPU 311 receives the selection of any access point 700 from the list displayed on the operation display unit 302. Specifically, the CPU 311 receives the selection of one SSID from among the SSIDs 1215 to 1217 of the access points 700 supporting the Personal method that are displayed on the screen 1214 illustrated in FIG. 12E, for example. Then, on the screen 1218 illustrated in FIG. 12F that is displayed in a case where an SSID is selected, the CPU 311 receives the entry of a password corresponding to the selected SSID, into the entry field 1219.

In step S1320, the CPU 311 connects to the access point 700 supporting the Personal method, and corresponding to the selected SSID. In step S1320, the screen 1221 illustrated in FIG. 12G is displayed, and in a case where connection with the access point 700 has been completed, the screen 1222 illustrated in FIG. 12H is displayed.

As described above, in the present exemplary embodiment, it becomes less likely that all SSIDs indicating the discovered access points 700 are displayed, and the user can easily recognize an authentication method supported by the access point 700 corresponding to a displayed SSID. Thus, in a case where the user wirelessly connects the MFP 300, the user can easily select the access point 700 in which an authentication method desired to be used is enabled.

In the above-described configuration in the present exemplary embodiment, in step S1305 of FIG. 13, the CPU 311 executes search for a neighboring access point 700, irrespective of whether the access point 700 is an access point 700 in which the IEEE 802.1X/EAP authentication method is enabled. Then, in step S1305, the CPU 311 executes the extraction of the access point 700 in which the IEEE 802.1X/EAP authentication method is enabled. In step S1307, based on the execution of extraction, the CPU 311 displays the access point 700 in which the IEEE 802.1X/EAP authentication method is enabled, and does not display the access point 700 in which an authentication method other than the IEEE 802.1X/EAP authentication method is enabled. Nevertheless, in a case where a search request of the access point 700 has been received in step S1301, the CPU 311 may execute search for an access point 700 in which the IEEE 802.1X/EAP authentication method is enabled. Then, the CPU 311 stores information indicating whether an instruction to search for the access point 700 in which the IEEE 802.1X/EAP authentication method is enabled has been issued. Then, the CPU 311 displays only the access point 700 in which the IEEE 802.1X/EAP authentication method is enabled, and may avoid displaying the access point 700 in which an authentication method other than the IEEE 802.1X/EAP authentication method is enabled. As for the configuration, the same applies to the Personal method.

In the present exemplary embodiment, the description has been given of a configuration in which the processing of the flowchart illustrated in FIG. 13 is started based on a search instruction of the access point 700 being received from the user. Specifically, the description has been given of a configuration in which the processing of the flowchart is started in a case where the user has selected the printer-used manual connection setting 1211 or the other connection methods 1212 on the screen 1210 illustrated in FIG. 12C, or in a case where the user has selected the search 1228 for a router complying with the EAP, on the screen 1226. Alternatively, in a case where the user has selected the printer-used manual connection setting 1211 or the other connection methods 1212, a program corresponding only to the processing in steps S1313 to S1320 in the flowchart in FIG. 13 may be started. In a case where the user has selected the search 1228 for a router complying with the EAP, on the screen 1226, a program corresponding only to the processing in steps S1303 to S1312 in the flowchart in FIG. 13 may be started. In other words, different programs may be started based on whether the user has performed an operation indicating a search instruction of the access point 700 in which the IEEE 802.1X/EAP authentication method is enabled, or an operation indicating a search instruction of the access point 700 in which the Personal method is enabled.

Furthermore, in a case where the IEEE 802.1X/EAP authentication method is enabled in a case where wireless direct is selected in the LAN setting illustrated in FIG. 12A, wireless direct connection is sometimes unavailable. Thus, a screen 1181 illustrated in FIG. 11K may be displayed to notify that wireless direct connection is unavailable.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-024925, filed Feb. 21, 2022, which is hereby incorporated by reference herein in its entirety.

What is claimed is:

1. A communication apparatus that is configured to communicate with an access point of a first type and an access point of a second type and that has a display, the access point of the first type operating to perform a first authentication method using an authentication server, the access point of the second type operating to perform a second authentication method without using any authentication server, the communication apparatus comprising:
one or more processors configured to:
receive a first instruction caused by a first operation;
receive a second instruction caused by a second operation that is different from the first operation;
execute a first display control for displaying, on a first screen displayed on the display based on the first instruction being received, information regarding the one or more access points of the first type discovered through a search executed by the communication apparatus, and not displaying, on the first screen, information regarding the access point of the second type even in a case where the access point of the second type is within a range that the communication apparatus executes the search; and
execute a second display control for displaying, on a second screen displayed on the display based on the second instruction being received, information regarding one or more access points of the second type discovered through a search executed by the communication apparatus, and not displaying, on the second screen, information regarding the access point of the first type even in a case where the access point of the first type is within a range that the communication apparatus executes the search.

2. The communication apparatus according to claim 1, wherein the access point of the first type operates in compliance with a first authentication protocol.

3. The communication apparatus according to claim 2, wherein the first authentication protocol is an Extensible Authentication Protocol.

4. The communication apparatus according to claim 1, wherein the first authentication method is an Institute of Electrical and Electronics Engineers (IEEE) 802.1X method.

5. The communication apparatus according to claim 1, wherein the second authentication method includes a Pre Shared Key method and a Simultaneous Authentication of Equals method.

6. The communication apparatus according to claim 1, wherein the one or more processors are further configured to:
perform a search for one or more access points in a case where the first instruction or the second instruction has been received;
extract one or more access points of the first type from the one or more access points discovered through the search, based on the first instruction being received, in a case where the one or more access points have been discovered through the search; and
extract one or more access points of the second type from the one or more access points discovered through the search, based on the second instruction being received, in a case where the one or more access points have been discovered through the search,
wherein the first display control is for displaying, on the first screen, information regarding the one or more access points of the first type extracted by the one or more processors, and not displaying, on the first screen, the information regarding the one or more access points of the second type included in the one or more access points discovered through the search, and
wherein the second display control is for displaying, on the second screen, the information regarding the one or more access points of the second type extracted by the one or more processors, and not displaying, on the second screen, the information regarding the one or more access points of the first type included in the one or more access points discovered through the search.

7. The communication apparatus according to claim 1, wherein the one or more processors are further configured to:
perform a first search for the one or more access points of the first type supporting the first authentication method, based on the first instruction being received; and
perform a second search for the one or more access points of the second type, based on the second instruction being received,
wherein the first display control is for displaying, on the first screen, the information regarding the one or more access points of the first type discovered through the first search, and
wherein the second display control is for displaying, on the second screen, the information regarding the one or more access points of the second type discovered through the second search.

8. The communication apparatus according to claim 1, wherein, the one or more processors are further configured to:
receive an operation for enabling, on the communication apparatus, authentication that is based on the first authentication method and an operation for disabling, on the communication apparatus, authentication that is based on the first authentication method,
wherein, based on the first operation being performed in a state in which the authentication that is based on the first authentication method is enabled, the first display control is executed, and
wherein, based on the first operation being performed in a state in which the authentication that is based on the first authentication method is disabled, the first display control is not executed.

9. The communication apparatus according to claim 1, wherein the first operation is performed on a first setting screen for searching for the access point of the first type, and the second operation is performed on a second setting screen for searching for the access point of the second type, the second setting screen being different from the first setting screen.

10. The communication apparatus according to claim 1, wherein the one or more processors are further configured to:
in a case where information regarding one access point of the first type is selected from among the information regarding the one or more access points of the first type that is displayed on the first screen, execute a connection with the access point of the first type corresponding to the selected information regarding the access point of the first type; and
in a case where information regarding one access point of the second type is selected from among the information regarding the one or more access points of the second type that is displayed on the second screen, execute a connection with the access point of the second type corresponding to the selected information regarding the access point of the second type.

11. The communication apparatus according to claim 1, wherein the one or more processors are further configured to:
in a case where, though the first instruction has been received, information regarding one access point of the first type is not selected from among the information regarding the one or more access points of the first type that is displayed on the first screen, and entry of a not-displayed service set identifier (SSID) of the access point of the first type is received, execute a connection with the access point of the first type corresponding to the entered SSID, and
in a case where, though the second instruction has been received, information regarding one access point of the second type is not selected from among the information regarding the one or more access points of the second type that is displayed on the second screen, and entry of a not-displayed SSID of the access point of the second type is received, execute a connection with the access point of the second type corresponding to the entered SSID.

12. The communication apparatus according to claim 11, wherein, in a case where, though the first instruction has been received, information regarding one access point of the first type is not selected from among the information regarding the one or more access points of the first type that is displayed on the first screen, and entry of a not-displayed SSID of the access point of the second type is received, not execute a connection with the access point of the second type corresponding to the entered SSID, and
in a case where, though the second instruction has been received, information regarding one access point of the second type is not selected from among the information regarding the one or more access points of the second type that is displayed on the second screen, and entry of a not-displayed SSID of the access point of the first type is received, not execute a connection with the access point of the first type corresponding to the entered SSID.

13. A control method of a communication apparatus that is configured to communicate with an access point of a first type and an access point of a second type and that has a display, the access point of the first type operating to perform a first authentication method using an authentication server, the access point of the second type operating to perform a second authentication method without using any authentication server, the control method comprising:
receiving one of a first instruction and a second instruction;
executing a first display control for displaying, on a first screen displayed on the display based on the first instruction being received, information regarding one or more access points of the first type discovered through a search executed by the communication apparatus, and not displaying, on the first screen, information regarding the access point of the second type even in a case where the access point of the second type is within a range that the communication apparatus executes the search; and
executing a second display control for displaying, on a second screen displayed on the display based on the second instruction being received, information regarding one or more access points of the second type discovered through a search executed by the communication apparatus, and not displaying, on the second screen, information regarding the access point of the first type even in a case where the access point of the first type is within the range that the communication apparatus executes the search.

14. A non-transitory storage medium storing a program for causing a computer to execute the control method according to claim 3.

15. The communication apparatus according to claim 1, further comprising one or more of the following:
  a printer configured to execute printing, or a multifunction printer configured to execute one or more of the following: printing, faxing, copying, and/or scanning; and/or
  a scanner configured to execute scanning.

16. The communication apparatus according to claim 15, wherein one or more of the following:
  the one or more processors are further configured to receive the first instruction and the second instruction from one or more inputs received from a user interaction with an input panel or a touch screen of the printer and/or the scanner;
  the printer and/or the scanner includes the input panel or the touch screen disposed on or in the printer and/or scanner; and/or
  the printer and/or the scanner displays the information of the first display control and/or the second display control on the display of the printer and/or scanner.

17. The communication apparatus according to claim 10, wherein the one or more processors are further configured to:
  communicate with an information processing apparatus through the connection with the access point of the first type in a case where the first instruction has been received; and
  communicate with an information processing apparatus through the connection with the access point of the second type in a case where the second instruction has been received.

18. The communication apparatus according to claim 1, wherein the one or more processors are further configured to:
  (i) establish a connection with an information processing apparatus using a communication method other than an Extensible Authentication Protocol or an Institute of Electrical and Electronics Engineers (IEEE) 802.1X method;
  (ii) receive information from the information processing apparatus to be used in establishing a connection with the access point of the first type and set or store the information in the communication apparatus; and
  (iii) establish a connection between the communication apparatus and the information processing apparatus using the access point of the first type based on the received information.

19. The communication apparatus according to claim 11, wherein the one or more processors are further configured to:
  communicate with an information processing apparatus through the connection with the access point of the first type in a case where, even though the first instruction has been received, the SSID of the access point of the first type is entered; and
  communicate with an information processing apparatus through the connection with the access point of the second type in a case where, even though the second instruction has been received, the SSID of the access point of the second type is entered.

20. The communication apparatus according to claim 8, wherein the one or more processors are further configured to:
  (i) determine whether the authentication that is based on the first authentication method is enabled or disabled;
  (ii) in a case where the authentication that is based on the first authentication method is determined to be disabled, display a notification on the display that the access point of the first type operating to perform the first authentication method supporting is unsearchable; and
  (iii) in a case where the authentication that is based on the first authentication method is determined to be enabled, then execute the first display control.

* * * * *